(12) United States Patent
Sherman et al.

(10) Patent No.: US 11,412,408 B2
(45) Date of Patent: Aug. 9, 2022

(54) LINK LAYERED NETWORKS WITH IMPROVED OPERATION

(71) Applicant: AES Corporation, Peabody, MA (US)

(72) Inventors: Michael Sherman, Peabody, MA (US); James P. Bastable, Jr., Danvers, MA (US)

(73) Assignee: AES Corporation, Peabody, MA (US)

( * ) Notice: Subject to any disclaimer, the term of this patent is extended or adjusted under 35 U.S.C. 154(b) by 0 days.

(21) Appl. No.: 17/105,783

(22) Filed: Nov. 27, 2020

(65) Prior Publication Data

US 2021/0084531 A1 Mar. 18, 2021

Related U.S. Application Data

(62) Division of application No. 15/876,443, filed on Jan. 22, 2018, now Pat. No. 10,880,774, which is a division of application No. 14/750,706, filed on Jun. 25, 2015, now Pat. No. 9,913,166, which is a division of application No. 13/297,431, filed on Nov. 16, 2011, now Pat. No. 9,100,894, which is a division of application No. 10/950,368, filed on Sep. 24, 2004, now Pat. No. 8,072,945.

(51) Int. Cl.
| | |
|---|---|
| *H04W 28/02* | (2009.01) |
| *H04L 12/28* | (2006.01) |
| *H04W 24/04* | (2009.01) |
| *H04W 28/18* | (2009.01) |
| *H04W 28/04* | (2009.01) |
| *H04W 40/04* | (2009.01) |
| *H04W 8/24* | (2009.01) |
| *H04W 84/18* | (2009.01) |

(52) U.S. Cl.
CPC ..... *H04W 28/0289* (2013.01); *H04L 12/2854* (2013.01); *H04W 24/04* (2013.01); *H04W 28/04* (2013.01); *H04W 28/18* (2013.01); *H04W 40/04* (2013.01); *H04W 8/245* (2013.01); *H04W 84/18* (2013.01); *Y02D 30/70* (2020.08)

(58) Field of Classification Search
None
See application file for complete search history.

(56) References Cited

U.S. PATENT DOCUMENTS

| | | | |
|---|---|---|---|
| 5,412,654 | A | 5/1995 | Perkins |
| 5,455,569 | A | 10/1995 | Sherman et al. |
| 5,488,608 | A | 1/1996 | Flammer, III |
| 5,491,837 | A | 2/1996 | Haartsen |
| 5,553,094 | A | 9/1996 | Johnson et al. |
| 5,974,236 | A | 10/1999 | Sherman |
| 6,297,823 | B1 | 10/2001 | Bharali et al. |

(Continued)

*Primary Examiner* — Anh Ngoc M Nguyen
(74) *Attorney, Agent, or Firm* — Potomac Law Group, PLLC; Vincent M DeLuca; Brian Buck

(57) ABSTRACT

A method and system for optimizing and keeping operational a wireless link layered network in which a system control and modifying message (SCMM) is elicited from nodes receiving information packets and based upon whether the node originating the SCMM is from a link layer level which is equal to or less than the link layer level eliciting the SCMM, rerouting or adjusting future transmissions can be effected or items like a less current time at a receiving node and a most recent utilization rate of a receiving node can be adjusted, recorded or set.

5 Claims, 12 Drawing Sheets

(56) References Cited

U.S. PATENT DOCUMENTS

| | | | |
|---|---|---|---|
| 6,304,546 B1 * | 10/2001 | Natarajan | H04L 12/2854 370/216 |
| 6,330,460 B1 | 12/2001 | Wong et al. | |
| 6,363,062 B1 | 3/2002 | Aaronson et al. | |
| 6,480,497 B1 | 11/2002 | Flammer, III et al. | |
| 6,807,224 B1 | 10/2004 | Takahashi et al. | |
| 6,810,263 B1 * | 10/2004 | Cheng | H04W 76/10 455/517 |
| 6,885,638 B2 | 4/2005 | Xu et al. | |
| 7,075,890 B2 | 7/2006 | Ozer et al. | |
| 7,366,096 B2 | 4/2008 | Swami | |
| 9,100,894 B2 * | 8/2015 | Sherman | H04W 28/0289 |
| 2003/0163554 A1 | 8/2003 | Sendrowicz | |
| 2003/0169700 A1 | 9/2003 | Nilsson | |
| 2003/0212567 A1 | 11/2003 | Shintani et al. | |
| 2004/0024717 A1 | 2/2004 | Sneeringer | |
| 2004/0038645 A1 * | 2/2004 | Rcunamaki | H04W 16/14 455/41.2 |
| 2004/0156345 A1 | 8/2004 | Steer et al. | |
| 2004/0246902 A1 | 12/2004 | Weinstein | |
| 2005/0037789 A1 | 2/2005 | Rhee et al. | |
| 2005/0157641 A1 | 7/2005 | Roy | |
| 2006/0058254 A1 | 3/2006 | Dina et al. | |

* cited by examiner

LINK LAYERED NETWORKS WITH IMPROVED OPERATION

CROSS-REFERENCE TO RELATED APPLICATION

This application is a division under 35 U.S.C. § 120 of copending application Ser. No. 13/297,431, filed Nov. 16, 2011, which is a division of application Ser. No. 10/950,368 filed Sep. 24, 2004, now U.S. Pat. No. 8,072,945.

FIELD OF THE INVENTION

The present invention is generally in the field of wireless communication networks, especially the field of security, machine to machine (M2M), and emergency wireless communication networks and more specifically, improvements in wireless link layered networks.

BACKGROUND OF THE INVENTION

The art of wireless communications and its use in emergency, M2M, and security networks has been well developed. In a sub-segment of the technology, also known as mesh networks, subscribers units are used by other units in the network as repeaters thus building a network providing communications from each of the remote subscribers transceivers to a central or collection transceiver. In most instances, the communication paths from each subscriber to such a central unit are fixed and determined during the commissioning of the whole network. Such systems are described, for instance by Burns (U.S. Pat. No. 5,129,096). Such fixed systems have a number of disadvantages, namely, they do not possess autonomous routing reconfiguration capabilities, when for one reason or another, subscribers drop out of the network, either temporarily or permanently, and require the intervention of an operator, to reestablish network integrity through the establishment of new communication links using the remaining resources (subscribers) in the network.

In U.S. Pat. No. 5,455,569 (hereby incorporated by reference and termed the '569 patent), the present inventor described a link layered wireless communication network that overcomes the shortcomings encountered in fixed communication paths wireless networks. particularly, said link layered network, automatically, and without the intervention of an operator, reconfigures the optimal communication paths when external parameters change over time. Typically such a reconfiguration will result in a routing having the minimal possible number of hops between a remote node and the central node.

However, it has been found that under some special circumstances, improvements to the teachings of '569 are required. For instance, the networks described in '569 were originally used mostly for security systems, such systems involve only minimal communications, since only alarm states and infrequent routing updates messages are required. More modern link layered networks have now found applications in a great variety of circumstances, and with new challenges, not contemplated in '569, nor in the present inventor's U.S. Pat. No. 5,974,236 (hereinafter '236). For instance, link layered networks associated with data based systems such as systems of vending machines, require updating not only of alarm systems, but a constant stream of data related to inventory levels and machines status; thus optimization of system throughput becomes important. Furthermore, the addition of new subscribers to existing networks have increased the number of nodes (each node is associated with such a new subscriber and thus includes its own transceiver) in a network, thus increasing the radio message traffic within a network. Furthermore, such network expansion would often involve more modern nodes having greater capacities and capabilities, necessitating new approaches to network throughput optimization. It is possible that a system of "mixed" nodes will degrade over time as the variation in the nodes increase. In addition, this potential degradation of the network will be the primary reason for the system to fail because the optimizing algorithms in place for years or decades could not anticipate variations unknown at the time the algorithms were written.

Link layered networks are now also used in sub-metering systems, whereby, means are provided to meter energy utilization (and demand rate) for a given location (i.e. an office building with multiple tenants), as well as the usage and demand rate for each tenant, and said means are interfaced each to a communication node that reports that information first to the node associated with the central meter (to ascertain correct summation of demand and utilization), and from there to a "command center." That command center can be either the utility company itself, or even an energy management system associated with the building and engaged in load optimization. Such communications between the central metering system at each such location and a command center may involve the use of other subscribers, which are not necessarily a part of the meter reading network. There is therefore a need to provide for optimized network throughputs in networks containing nodes of differing capacities and capabilities.

Other applications of link layered network also involve both mobile (such as taxicabs) and stationary "points of sales" where credit cards readers are networked into a link layered network reporting to a central node. As is the case with submetering systems, there is a need to provide for optimized communications to a central node, often using subscribers having nodes of diverse capacities.

The prior link layered network art ('569 and '236), while teaching adequately how individual nodes can be dropped from, or incorporated in a network, fails to provide for special cases, for instance when a whole network is shut down. As the numbers of, as well as the density of nodes in a link layered network are increased, particular problems are encountered, for instance, recovery of a network from an extreme state. An extreme state could result from local power failure, rolling black outs, or even the intentional shut down of a network for various reasons. In the prior art, when such a system is "awakened" after such a failure, many of the nodes, simultaneously, seek to reestablish their best routing by sending out messages that elicit responses from neighboring nodes, thus allowing the re-incorporation of a node into the network. In such larger networks, one runs into the problem of excessive traffic and thus congestion, and failure to timely reestablish communication links, particularly after power outages or intentional shut down of the network, when all subscribers, almost simultaneously seek to reestablish communication routes to the central transceiver node. There is therefore a need for an optimized method of restarting a network without encountering such radio traffic congestion.

Furthermore, new subscriber additions also bring about networks that have transceivers of different capabilities, capacities and characteristics, necessitating both optimization of throughput as well as routing in such networks. Typically, newer technology will have greater capacity per nodes (where capacity is understood to be the size of each packet transmitted). Flammer in U.S. Pat. No. 6,480,497, attempts to optimize net throughput in mesh networks by modifying signal characteristics in response to determining performance metrics of the last received signal, over a given link between two nodes. This approach has three major shortcomings. Firstly, optimization is carried out only on each link, and the teachings do not assure that such optimization will necessarily result in overall network optimization, since the optimization of throughput process on each link itself may simply add a large number of additional unnecessary hops. A second shortcoming is that in link layered networks of the present invention, it is necessary to adapt the system to such signal characteristics variations between nodes, rather than modifying them as Flammer '497 suggests. A third shortcoming of a system of the type described in '497 is that it lacks "directionality" and does not possess "sequentially" of the optimization process of each link between any two nodes. Thus, often, an optimizing process of the link between any two nodes may require re-optimization of neighboring links causing incessant system oscillations and excessive radio traffic in the network. There is therefore a need to optimize routing of packets in link layered network, despite having incongruity in nodes packets capabilities and capacities, such as baud rate and packet length, and therefore consolidate in one single network nodes of vastly different characteristics. There is further a need for such an optimization process which will not by itself throw the network into constant oscillations and readjustments. Furthermore, such optimization should promulgate within the whole network, standards generated from the then designated central node.

Flammer et al in U.S. Pat. No. 5,488,608 (the '608 patent) suggests that traffic in a network can be routed, without having a network directory at each node, and indeed, when intermixing older technology with newer technology in link layered network, there are practical limitations on local memory, preventing sometimes, storing all possible routings between any two points at each node (as taught in the present inventor's U.S. Pat. No. 5,974,236). However, the '608 approach relies on assigning to each node an identifier indicative of the nodes coordinate locations, and using those coordinates for facilitating routing of packets to and from such nodes. This approach, however will not work, when part of the nodes have variable geography, such as mobile nodes contemplated in '236 and the present invention, nor will that approach work when the link layered network is, for instance a submetering network, where all the nodes are typically, essentially, at the same location or in the same building.

The lack of information on the link layer level in the header of the '608 packets will often result in packets being transmitted almost randomly, till they find the destination node to which they were intended, or worse, result in circular transmissions (where the same packet is handled between a sub group of all nodes that does not include the destination node, in essence repeatedly) causing unnecessary radio traffic congestion in the network. There is therefore a need to provide for a link layered network in which circular transmissions and radio traffic overload is avoided, that does not rely on the specific knowledge of the coordinates of each of the nodes in the network, and optimizes and accommodates future, currently unknown nodes yet to be implemented on the network.

When a practical link layered network is installed, some of its nodes, by virtue of their geographical location, height and type of antenna, level of RF noise and interference, or even universality of capacity, or a combination of these factors, become preferential repeaters. Such nodes can be termed "Critical Nodes" in that they serve as a hub for a large number of routes from remote transmitters to the then designated central node (from here on we will term this the "central node", but it should be understood that according to the teachings of '236, any node in the system can be designated the "then central node" without interfering with the operation of the system).

Such critical nodes in the prior art would thus become overloaded and transmit from remote nodes to the central node a disproportionate amount of the network's messages, creating a localized over utilization of the available broadcasting spectrum, and in some cases, these result in loss of packets. There is therefore a need to equalize the traffic load to other less critical nodes, even though, some messages will no longer be transmitted with the minimum number of hops, as taught in '569 and '236, but be optimally transmitted, so as to optimize both the utilization of the various nodes and the radio channel. This by spreading the transmissions over a wide geographic area in the system as well as allowing the number of hops required to transmit a packet from a remote node to the central node to be greater than minimal.

OBJECTS OF THE INVENTION

It is a major object of the present invention to provide for a link layered network that consolidates within it nodes having vastly different capacities, yet, optimizing routing within said network to accommodate such differences.

It is yet another objective of the present invention to provide optimal spectrum efficiency utilization within a certain geographical area by minimizing system management traffic, or transmissions, and by equalizing geographical distribution of transmission, particularly lowering the load on critical nodes in the network.

It is a further object of the present invention to provide methods of increasing link layered network throughput by optimizing routing of messages, not just by minimizing the number of hops each message is subjected to in order to reach its destination, but making such optimization scheme dependent also on the specific message characteristics. This rather than modifying a message's or a signal's characteristic.

It is yet a further object of the present invention to provide in a link layered network, a method of preventing network oscillations.

Yet another object of the present invention is to provide methods preventing transmission congestion upon restarting of networks to post a black out, a rolling black out and or intentional shut down of the network, by providing a stratified randomization process allowing the gradual reestablishment of the network rather than a simultaneous attempt to reestablish routing which results in excessive traffic congestion.

It is a general object of the present invention to provide for network optimization by optimizing nodes operational parameters and routing expansively, namely, in a direction from the central node to the most remote nodes, thus keeping at all times at each node optimal operational parameters and routing lists that minimizes message hops while keeping rational geographical distribution of transmissions and providing for vastly different nodes (and thus packets or message) characteristics within the network. It is also an object to obviate the drawbacks of earlier systems as described.

SUMMARY OF THE INVENTION

These objects, and others which will become apparent hereinafter, are attained in accordance with the present invention by the judicious use of a System Control and Modifying Message (hereinafter SCMM) and a number of algorithms executed at each node, some in response to the receipt of such an SCMM, others in response to changes in the network. Said SCMM is sent in lieu of normal acknowledgment of receipt of a packet in response to the successful receipt of a packet by any node in the system.

The SCMM contains the most recent information on the node that sent that SCMM, including, but not limited to, the time at the acknowledging node, the power level of the transmission (as set at the acknowledging node) as well as the received signal strength, the capacity of the node (packet length), and the most recent utilization rate of the node.

The SCMM also contains information as to the node's current link layer level, the deviation from the standard network frequency the last message was received at, the unique identity of the node sending the SCMM as well as who the SCMM is targeted to (though other nodes can and do "hear" that SCMM and act on some of the information contained in the SCMM, as will become clearer below). Additionally, the SCMM contains a "packet sequence number" that acts as a unique identifier of that packet, here the packet is the received packet to which the SCMM is an acknowledgment.

The packet sequence number is used to prevent loop formation, whereby a packet is transmitted in the network and is returned to the sending node for retransmission. It should be appreciated that while an SCMM is a packet as well, since it is always an acknowledgment it does not have a packet sequence number, only "data packets" have such an identifying number.

It should be understood that the central node may not be the point of use of the information or data included in the packets received by it. The central node may communicate the information via other means (not the link layered wireless network itself) to a data collection, data review or a command center, where such data may be acted on. Such other communication means may include land lines, other public wireless networks, LAN or WLAN, or even an internet connection. It is quite possible, and sometimes desired, that such communication means be changed during the operation of the whole system, and such a changeover may dictate a change in the optimized routing of messages from subscribers nodes to the central node. For instance, if the capacity to transmit information to such a command center is changed due to a changeover in the communication means between the central node and the point of use of the data transmitted from the link layered network. If such a change were to occur, it would be communicated through the SCMM, for instance by identifying a new packet length, more compatible with the said communication means transmission capacity.

In general, the central node, having a link layer level, would receive a message addressed to it from a subscriber unit, and the last hop from the network to the central node would typically be from one of the nodes having a link layer 1. When the central node receives such a message, the acknowledgment will be in the form of an SCMM, with an updated, if necessary, set of data. The SCMM is heard by all link layer 1 nodes, and to the extent that a change in the central node condition was included, all these link layer 1 nodes will make the necessary changes to their routing to accommodate the change, if necessary.

For instance, to optimize throughput in the link layered network and avoid excessive loss of messages, it is very important that the frequency of the carrier radio signal be as close as possible to the network frequency, as explained further below. Various local operational factors affect the transmitters frequency and from time to time the deviation from the network frequency must be corrected. When the central node receives a message from one of its link layer 1 nodes, it compares the frequency to the central frequency of the network and the SCMM sent back includes the deviation from that standard frequency. If the deviation is greater than a predetermined value, an algorithm, described in more detail below, causes the local processor at the node receiving the SCMM to readjust the broadcast frequency to the network's frequency.

It should be noted, that the SCMM is received not only by the node that sent the message to which the SCMM is an acknowledgment, but by all nodes that are within the range of the node transmitting the SCMM. However, only the node that sent the original message acts on information relative to frequency deviation, other nodes that "hear" that SCMM do not act on that information.

Similarly, the SCMM contains data from the responding node indicating the strength of the signal it received by the node sending the original signal. If that signal is outside a given range of strength, an algorithm at the sending node, now receiving that SCMM, will then adjust the signal strength for the next transmission to be within the desired range. Here too, the nodes in the system that receive that SCMM (which is not directed to them), will not act on this signal strength data. We term these data, namely, "frequency deviation", and "Received Signal Strength", "Unique" SCMM data, in that only the node that sent a message to which the SCMM is an acknowledgment can act on such data.

Since the link layered networks of the present invention are dynamic, contain nodes of various capacities and may change in time, the capacity of a node (the length of a packet transmitted) may change in time as well. Such capacity is also included in the SCMM and treated as a "Unique" data.

On the other hand, each SCMM will include data that are "Universal", namely, every node that receives that SCMM, whether or not it is the sender of the message that elicited the SCMM acknowledgment, may act on such data. Universal data include the time at the acknowledging node and a measure relating to the then current rate of packet processing, that node is engaged in (for instance in the form of a number designating the number of packets processed in the last 60 seconds). In some embodiments of the invention, however, it is better to treat the rate of packet processing as "Unique" data acted upon only by the node instigating the sending of the SCMM, as is further described below.

It should be mentioned here that time synchronization within a link layered network was already taught in '569 and '236, and in the embodiment of the present invention, such is simply adopted from the present inventor's prior work. Suffice to say that the inclusion of the time at the acknowledging node in the SCMM allows the link layered network to standardize and synchronize a universal time at all nodes within the network The inclusion in the SCMM of the rate of packet processing at a given node, allows now for geographical redistribution of radio traffic away from nodes that are critical nodes. When the SCMM indicates that the acknowledging node has a rate of packet processing greater than a predetermined threshold, the node originating the message will select a route avoiding the critical node that acknowledged last (with said SCMM) and may even increase its link layer level to do so as described in more details below.

There will be occasions, such as after power outages, or a rolling black out, or even after intentional network shut down, when the network is powered up simultaneously. In the prior art, the simultaneous powering up or awakening of a link layered network encountered major difficulties due to the creation of excessive radio traffic as each node in the system attempts to reestablish and validate its routing lists. Under extreme conditions, particularly in high nodes density networks, such network awakening can take an inordinately long period of time to fully reestablish all communication links and routing optimization. In the present invention, this problem is solved by stratifying the awakening process and randomizing the awakening process at each link layer level.

Specifically, delay times are introduced post re-powering of the network, or any specific node, before a node actively seeks to reestablish routing lists and thus communication links to the link layered network, through a "discovery" message sent by the awakening node. The delay time before transmitting a discovery packet is longer the higher the link layer level, n, of the node is. Furthermore, since there might be a very large number of nodes having the same link layer, in some embodiments of the invention, reestablishment of the communication links of nodes having the same link layer is also stratified. This stratification is achieved by having said delay time randomized between the nodes having the same link layer, within the link layer level assigned delay time window, as further explained below.

It should be understood that an SCMM is sent in response to the receipt of a message, not just by the central node, but by any node receiving a message from a neighboring node. Thus, any modification in the optimization process creeps up the various links within the link layered network until all nodes have updated their routing lists as well their own various operational parameters, such as adjusting their broadcast frequency, adjusting their signal strength, keeping their local internal clock in synchronism with the central node, and seeking alternate routes, when message characteristics have changed for one reason or another.

For clarity, it is easier to discuss two types of SCMM, we term these SCMM(+) and SCMM(−). An SCMM(+) is one sent in response to a message received from a node having a higher link layer (typically, a message eventually destined to reach the central node), while SCMM(−) is an SCMM sent as an acknowledgment of receipt of a message from a node having a lower link layer (thus a message destined to a subscriber deeper in the field). Since the majority of this specification deals with SCMM(+), it should be understood that in the following, SCMM will mean SCMM(+), and only when discussing an SCMM sent in response to a message originating at a node having a lower link layer, the terminology SCMM(−) will be used.

In one aspect the invention is a method of dynamically keeping operational and optimized, without operator intervention, in response to changes occurring at any node, a wireless link layered network comprising a plurality of transceivers at respective nodes which route communications from any node to a then central node of the network and wherein said communications are in a form of information packets transmitted from one node to another. The method comprises the steps of:

(a) from each node successfully receiving an information packet, eliciting as an acknowledgment, a system control and modifying message (SCMM) containing optionally the following items of information:
(a1) a current time at the receiving node,
(a2) a received signal strength,
(a3) a packet length or capacity of the receiving node,
(a4) a most recent utilization rate of the receiving node,
(a5) a deviation from standard network frequency of the received information packet,
(a6) an identification of the receiving node,
(a7) an identification of the node eliciting the SCMM, and
(a8) a packet sequence identifier for the acknowledged information packet;
(b) determining whether the node originating the SCMM is from a link layer level equal to or less than the link layer level of the node eliciting the SCMM; and
(c) where the node originating the SCMM has a link layer level equal to or less than the link layer level of the node eliciting the SCMM, at the eliciting node and in response to the SCMM, rerouting and/or adjusting future transmissions based at least upon some of the information items (a1-a6) contained in the SCMM.

The method can include:
at the node eliciting the SCMM:
(i) determining whether the node receiving the acknowledged information packet and from which the SCMM has been elicited has adequate capacity for the acknowledged information packet;
(ii) if the node from which the SCMM has been elicited has insufficient capacity, registering that capacity for other messages and routing future messages requiring the capacity of the acknowledged information packet through other nodes; and
(iii) if the node from which the SCMM has been elicited has sufficient capacity, registering that capacity and continue to route future messages requiring the capacity of the acknowledged information packet through that node The method can also include at the node eliciting said SCMM:
(i) determining whether the node from which the SCMM has been elicited has adequate received signal strength for the acknowledged information packet;
(ii) if the node from which the SCMM has been elicited has insufficient received signal strength, at the eliciting node, increasing power by an amount which will cause the received signal strength to be equal to an ideal signal strength for other messages to be routed through that node;
(iii) if the node from which the SCMM has been elicited has greater received signal strength than an ideal value at the eliciting node, decreasing power by an amount which will cause the received signal strength to be equal to the ideal signal strength; and
(iv) registering a new power value for the node from which the SCMM has been elicited.

The step (ii), the power can be increased to a maximum power available at the node eliciting the SCMM.

In a feature of the invention the method further comprises from the utilization rate included in the SCMM, determining at the node eliciting the SCMM whether the utilization of the node from which the SCMM has been elicited is such that the node from which the SCMM has been elicited should be used further and/or altering routing information stored at least one of a plurality of nodes receiving the broadcast SCMM based upon the degree of utilization incorporated in the SCMM.

From the utilization rate included in the SCMM, it can be determined at the node eliciting the SCMM whether the utilization of the node from which the SCMM has been elicited is such that the node from which the SCMM has been elicited should be used further and/or altering routing information stored in the node eliciting the SCMM should be altered.

It is possible from information in said SCMM as to a deviation from standard network frequency of the received information packet, to reduce a broadcast frequency at the node eliciting the SCMM to equal an SCMM originating node frequency or increase the broadcast frequency at the node eliciting the SCMM to equal the SCMM originating node frequency.

A new frequency can be stored at the node eliciting the SCMM in a frequency database thereof.

The method can further comprise:

comparing said current time information from the SCMM with a clock of a node receiving the SCMM; and decreasing or increasing the time of the clock at each node receiving said SCMM to equal the time represented by said time information plus the time to propagate the time signal to the respective node.

In another aspect the method of dynamically keeping operational and optimized, without operator intervention, in response to changes occurring at any node, a wireless link layered network comprising a plurality of transceivers at respective nodes which route communications from any node to a then central node of the network and wherein said communications are in a form of information packets transmitted from one node to another can comprise the steps of:

(a) broadcasting from each node successfully receiving an information packet, as an acknowledgment, a system control and modifying message (SCMM) containing at least the following items of information:
  (a1) a current time at the receiving node, and
  (a2) a most recent utilization rate of the receiving node, (b) at any node capturing said SCMM, determining whether the node originating the SCMM is from a link layer level equal to or less than the link layer level of the node capturing the SCMM; and (c) where the node originating the SCMM has a link layer level equal to or less than the link layer level of the node capturing the SCMM, in response to the SCMM carrying out required changes at all nodes of the network capturing said SCMM based upon the information items (a1 and a2) contained in the SCMM.

The changes can include adjustment of local time at each of the nodes capturing said SOD! based upon the time information (a1). The change can also include rerouting of information packets to other nodes than said receiving node when said receiving node has a utilization rate above a preset threshold.

The invention is also a method of preventing network oscillation in a wireless link layered network comprising a plurality of transceivers at respective nodes which route communications from any node to a then central node of the network and wherein said communications are in a form of information packets transmitted from one node to another, said method comprising the steps of:

(a) from each node from which a message is to be sent to other nodes of said network, attaching a token specific to each message sent;

(b) sending the messages with the tokens attached to other nodes of the network; and (c) rejecting for retransmission at each node any received message containing the token specific to that node.

In its method aspects the invention includes a method of preventing network congestion upon restart of a wireless link layered network comprising a plurality of transceivers at respective nodes which route communications from any node to a then central node of the network and wherein said communications are in a form of information packets transmitted from one node to another, said method comprising stratifying reestablishment of communication among said nodes whereby restart is effected layer by layer, and within each link layer level, restart time is randomized.

In an apparatus aspect the invention is a wireless link layered network comprising a plurality of transceivers at respective nodes which route communications from any node to a then central node of the network and wherein said communications are in a form of information packets transmitted from one node to another, some of the nodes having a link layer level less than the link layer level of others of said nodes, said nodes being configured upon successfully receiving an information packet, to generate as an acknowledgment, a system control and modifying message (SCMM) containing optionally the following items of information:
  (a1) a current time at the receiving node,
  (a2) a received signal strength,
  (a3) a packet length or capacity of the receiving node,
  (a4) a most recent utilization rate of the receiving node,
  (a5) a deviation from standard network frequency of the received information packet,
  (a6) an identification of the receiving node,
  (a7) an identification of the node eliciting the SCMM, and
  (a8) a packet sequence identifier for the acknowledged information packet, each transmitting node determining whether the node originating the SCMM is from a link layer level equal to or less than the link layer level of the node eliciting the SCMM, and where the node originating the SCMM has a link layer level equal to or less than the link layer level of the node eliciting the SCMM, in response to the SCMM at the node eliciting the SCMM, rerouting and/or adjusting future transmissions based at least upon some of the information items (a1-a6) contained in the SCMM.

A wireless link layered network of the invention can comprise a plurality of transceivers at respective nodes which route communications from any node to a then central node of the network and wherein said communications are in a form of information packets transmitted from one node to another, said nodes being configured upon successful receipt of an information packet, to generate as an acknowledgment, a system control and modifying message (SCMM) containing at least the following items of information:
  (a1) a current time at the receiving node, and
  (a2) a most recent utilization rate of the receiving node, and upon determining whether the node originating the SCMM is from a link layer level equal to or less than the link layer level of the node eliciting the SCMM, resetting a local time for each node receiving the SCMM where the node originating the SCMM has a link layer level equal to or less than the link layer level of the node eliciting the SCMM, in response to current time at the node originating the SCMM or rerouting information packets to other nodes in response to an excessive utilization rate of the node originating the SCMM.

The wireless link layered network can comprise a plurality of transceivers at respective nodes which route communications from any node to a then central node of the network and wherein said communications are in a form of information packets transmitted from one node to another, in which the continuous retransmission of the same message in a sub set of the nodes is prevented, said prevention being effected by including in each information packet to be sent to other nodes of said network a token specific to the sending node and by rejecting for retransmission at each node any received message containing the token specific to that node.

The invention includes a wireless link layered network, which in response to changes at any node, is dynamically and without the intervention of an operator kept operational, by promulgating into the network information as to such changes via message acknowledging SCMM, and assuring that only the node eliciting such an SCMM uniquely acts upon said information, providing the SCMM originated from a node having a link layer equal or lower than the eliciting node.

The invention also includes a wireless link layered network which in response to communication crowding in some of its communication path, dynamically and without the intervention of an operator reroutes message to parts of the network that are less congested, said rerouting being affected by having all nodes capturing an SCMM from a node having high utilization rate exceeding a preset level, removing said SCMM originating node from their respective routing list, provided that the link layer level of the node originating the SCMM is equal or lower than each respective node capturing said SCMM.

BRIEF DESCRIPTION OF THE DRAWINGS

The above and other objects, features, and advantages of the invention will become more readily apparent from the following description, reference being made to the accompanying drawings in which.

DETAILED DESCRIPTION OF THE INVENTION

Figure 1:
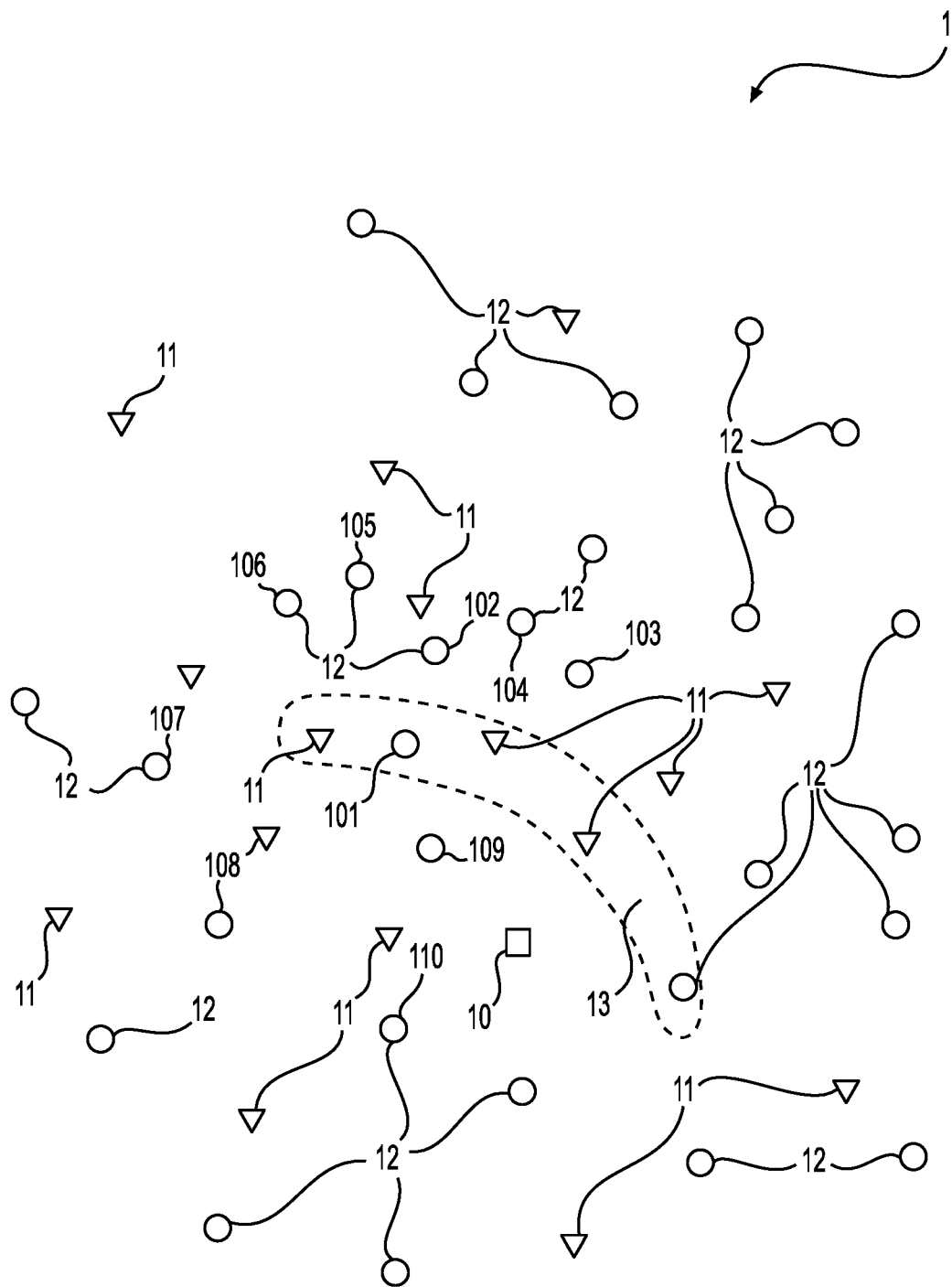
FIG. 1 is a diagram for a general description of a link layered network having a plurality of nodes having different capacities.

FIG. 1 shows a schematic depiction of a link layered network, 1, having a central node, 10, and a plurality of subscriber nodes, 11 and 12. The subscriber nodes 11 and 12 differ from each other, in that they may be respectively older and newer technologies, or attached to different type of subscribers. It should be understood that a modern link layered network may include more than two such classes of nodes, and that FIG. 1 shows only two such classes only for simplification purposes. FIG. 1 also depicts a topological, geographical or terrain type barrier, 13, that might run through the network's space. Such a terrain feature can prevent direct communications of some of the nodes to the central node and creating in the process nodes that have become critical, in that too much traffic would normally be directed through them. It should be understood that a node can become critical not only due to terrain constraint, but also because some nodes, due to technological superiority, or superior antenna placement, get included in the preferred routing list of more of the nodes in the network.

Figure 2:
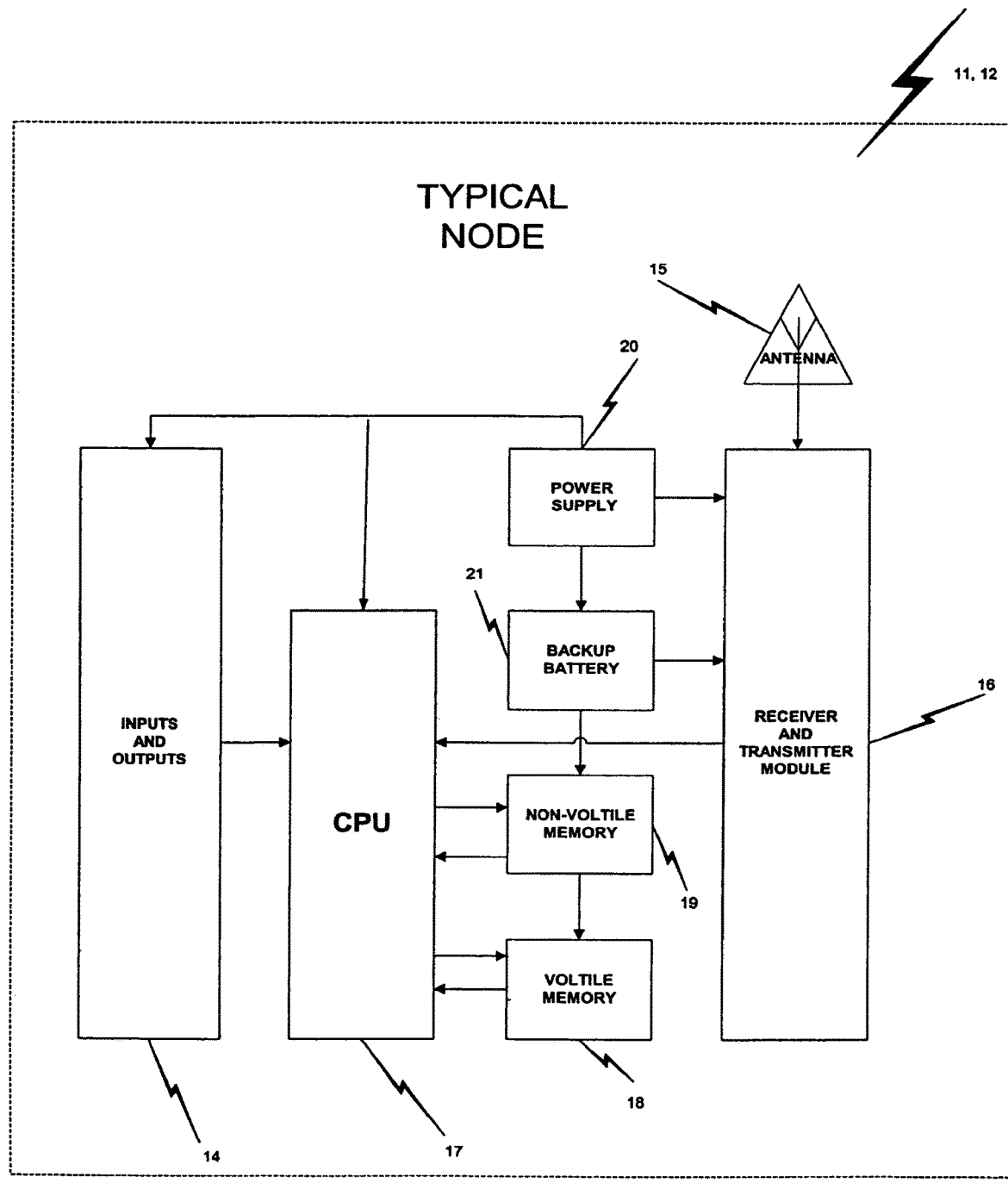
FIG. 2 is a block diagram of a typical subscriber unit (node)

In FIG. 2, is shown a typical subscriber node, 11 or 12. The node interfaces with the local environment through inputs and outputs, 14. Inputs may be, but are not limited to, alarm conditions, results of meter readings, data stream related to credit card transactions, various automated inventory readings (such as in networked vending machines) etc. Outputs might be various commands, such as credit card transaction authorization, turning on and off various devices (particularly in remotely controlled processes and electrical load optimization schemes), various system resetting etc.

The interface of the subscriber node to the RF network is through an antenna, 15, connected to a transceiver module, 16 (which of course comprises of a receiver and transmitter module). Signals received at, or transmitted from the node, are processed in a central processing unit, CPU, 17. Not shown for simplicity are associated signal processing and conditioning elements between the CPU and the transceiver. Each node has both volatile memory 18, and non volatile memory 19. Typically, the non volatile memory will contain various programs related to the node operation and its control in general, programs that execute routing algorithms as well as a number of preferred routing lists. The volatile memory is used to store received and ready to be sent or repeated packets as well as most current routing lists.

The routing list contains not only the nodes through which packets are to be repeated, or to which new packets need to be sent, but also the capacity of the node, namely the length of the packets capable of being transmitted through the node, the utilization rate of the node as well as the power level to be used in transmitting packets to various neighboring nodes. It should be understood that the power level of transmission is unique to the unique neighboring node a packet may be addressed to.

It should be understood that different kind of nodes may have different capacities in said memories, thus the length of packets transmittable by different types of nodes could and is different in such a network.

Each node is powered by a power supply unit and has its own back up battery (20 and 21 respectively). In some embodiments of the networks of the present invention, the power supply is simply a battery, or it may be powered by the AC mains with no battery, or it may have both AC mains and a battery, (in some cases the battery is rechargeable from solar panels, or AC mains). The nature of the power source in a given node imposes limitations on the ability of these nodes to actively participate in the link layered network packet repeating features, and is taken into account when the network is forced to reconfigure itself dynamically, due to changes in the network's conditions or the condition of the node.

Figure 3:
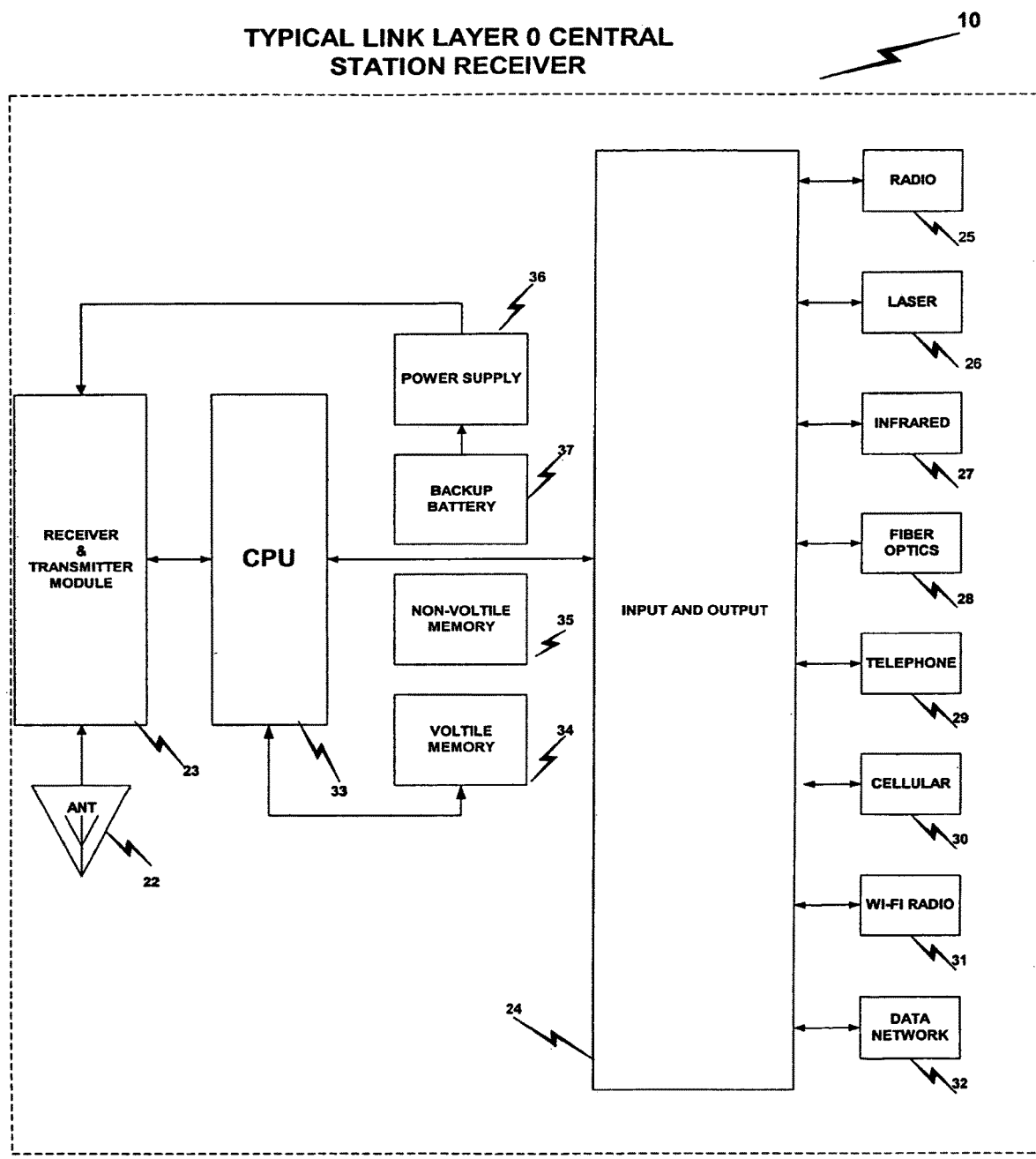
FIG. 3 is a block diagram of a then designated central node.

In FIG. 3, the central node 10, has a similar interface with the network, consisting of an antenna 22, and a transceiver 23. The interface to any central command center, data collection center, credit authorization type of system etc, is conducted through an input/output module 24 and a variety of communication means (25 to 32). Apart of the interface with a "central command center" (or equivalent), the central node is quite similar to subscriber's nodes, in that it has a CPU 33, volatile and non volatile memory 34 and 35 respectively, as well as a power supply, 36 and back up battery 37.

While typically, the communication means between the central node (the central node has by definition a link layer of 0) and wherever the data are used or various network commands are issued, are relatively fixed. However, from time to time, there is a need to change such a link. For instance, initially, said communication link could be via a land line telephone 29, with a relatively high capacity, but an unanticipated failure of such a connection may force the system to "fall back," on another means of communication, for instance, an independent radio link (typically at a different frequency than the frequency used by the link layered network) which has much smaller capacity.

It should be understood that capacity changes in other nodes, not only the central node, could occur as well in a dynamic system. It is therefore necessary to adjust routing to cope with such changes in capacity. In the instant invention, this is achieved by configuring the traditional acknowledgment (Ack) message in a unique manner as a "System Control and Modifying Message", or an SCMM. Specifically, the SCMM. contains within it the capacity of the acknowledging node.

Figure 4:
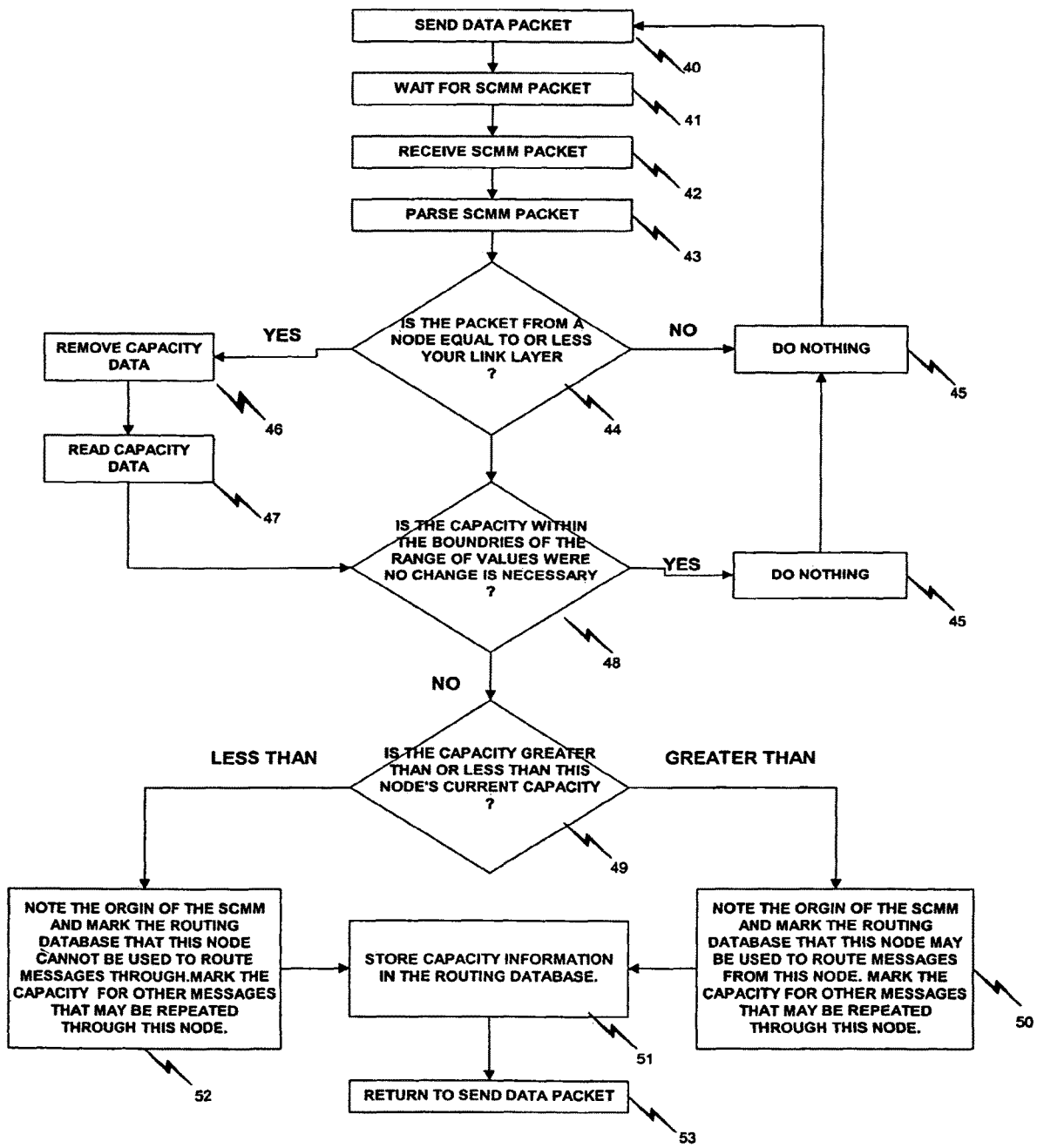
FIG. 4 is a logic diagram of rerouting due to packet capacity changes.

In FIG. 4, we show an algorithm designed to assure that the routing of messages always account for the capacity of the nodes involved in a specific route. Typically, a node will be sending a data packet at 40, and then wait to receive an acknowledgment in the form of an SCMM at 41. Once the SCMM was received at 42, the SCMM is parsed at 43 and the link layer level of the acknowledging node, the one that responded with the SCMM, is read at decision box 44.

If the SCMM is an SCMM(−), the link layer of the node sending the SCMM is greater than the receiving node link layer, thus "NO" at decision box 44 is selected, no change is implemented, at 45, and the system goes back to be ready to send the next packet on its list at 40. This assures that capacity changes indications flow from lower link layers to higher link layers in the system, thus spreading out into the network the information about a new capacity requirement, or special routes for special capacity packets. This feature of the algorithm, assures directionality of changes from the central node to all nodes in the network, so that capacity information from an SCMM(−) does not cause changes in nodes of lower link layers.

Referring back to decision box 44, if the link layer of the acknowledging node which sent the last SCMM is equal or lower than the link layer level at the receiving node, "YES" is selected at decision box 44. At box 46, the capacity data are retrieved from the parsed SCMM, read at 47 and at decision box 48 the capacity of the node sending the SCMM is compared to the packet capacity at the receiving node. If said capacity is within the boundaries of the range of values that the receiving node uses for transmitting its own packets, "YES" is selected at decision box 48, and no action is taken at 45, and the node is readied to transmit the next packet on its list at 40. If, however, at decision box 48 it is determined that the capacity of the acknowledging node, the node replying with the SCMM, is outside said boundaries, "NO" is selected. It should be understood, that due to the dynamic nature of the link layer network, changes in the capacity of nodes (including the central node) can occur at any time. This can be the result of additions of new nodes to the system, changes in the central node or failure of some existing lower link layer nodes. The changes can be either increases or decreases in node capacity. The test at decision box 48 simply ascertains that the capacity of lower link layer nodes has not changed ("Yes" in box 48) or changed ("NO" in box 48). If "no" is selected, at decision box 49, the capacity of the node originating the SCMM is compared to the local node's capacity. If said capacity is greater than the local capacity, "Greater than" is selected. The value chosen at 48 is selected so that no oscillation will be caused by small changes in said capacity.

At 50, the origin of the SCMM is noted in the local routing data base, marking the node sending said SCMM at the top of the routing list for packets of that capacity or smaller (if it was not already the preferred node), and storing this capacity information for that node in the local node routing list at 51.

However, if at decision box 49, "Less than" is selected, at 52, the origin of that SCMM is noted as one that cannot be used to route packets (of that capacity), and at 52, that information is updated by removing the origin of the SCMM from the local routing list for the stated capacity. The last box 53, is equivalent to the box 40, where the system is now ready to send the next data packet, this time, with a new routing list.

Thus, by implementing the algorithm described in FIG. 4, the local nodes know at all times what is the maximum capacity packets that can be transmitted through any of its neighboring nodes.

It should be appreciated that node packet capacity in a link layered network may change in time not only due to changes in the type of communication the central node might have with a "central command" station, as mentioned above. Under some circumstances, some critical nodes may drop from the network or come back on, and since it is always desired to send packets through the network at the highest capacity possible, such changes are propagated in the network by using the algorithm shown in FIG. 4 on each SCMM. It should also be appreciated that such changes in capacity are always driven upward from lower link layer nodes to higher link layer nodes. In that respect, the link layered network is not truly a mesh network but a hierarchy tree network with a specific directionality of implementation of route updates and modifications.

As mentioned above, the routing list must also contain for each node the then best power level at which it will transmit a packet to a target node. If the power is too low, packet loss (complete or partial) may result. If the power level is too high, congestion of the airwave with unnecessary traffic will result.

Figure 5:
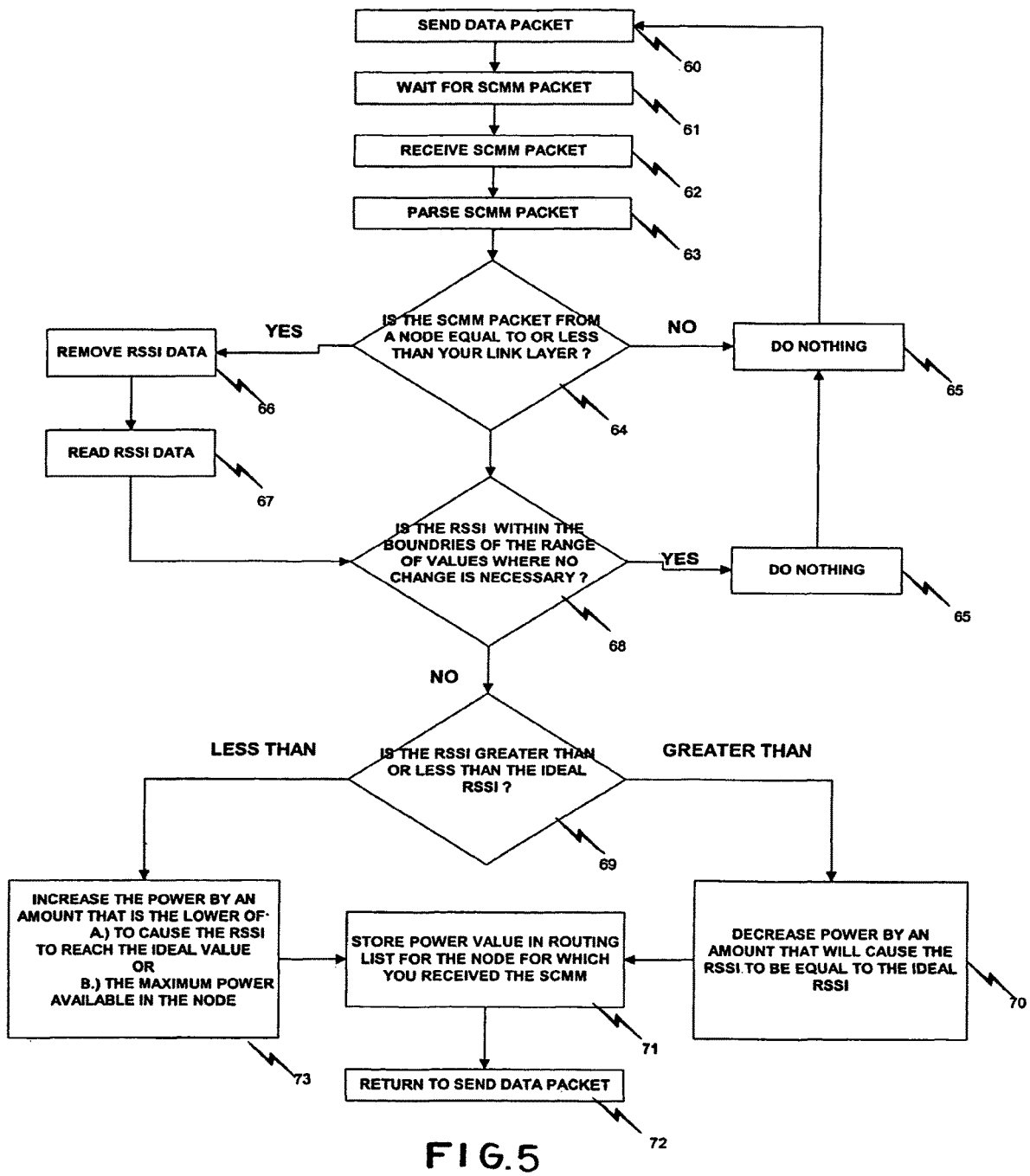
FIG. 5 is a logic diagram providing adjustment to received signal strength.

In FIG. 5, is shown a flow diagram of the algorithm used to keep each node at the proper power level for optimizing communications in the link layered network of the present invention. Specifically, at 60, a data packet is sent, and at 61, the node is waiting for an acknowledgment in the form of an SCMM from the node to which the packet was sent. The node then receives the SCMM at 62 and parse said SCMM at 63.

As before, to assure that modification in routing conditions is only conducted from lower link layers to higher link layers, at decision box 64, SCMM(−) are discarded by determining if the SCMM is from a node having a link layer equal to or lower than that of the local node. If the SCMM is from a node having a higher link layer, "NO" is selected at decision box 64, and at 65, nothing is done and the node is ready to send the next packet at 60.

However, if at decision box 64, "YES", is selected, namely the SCMM is from a node having either a lower or equal link layer than that of the local node. At 66, the Received Signal Strength Indicator (RSSI) is retrieved from the incoming SCMM and read at 67. At decision box 68, it is determined if the RSSI is within the boundaries of operational range acceptable.

It should be understood, here, that not every deviation of the RSSI from the standard is acted upon at the local node, only when the RSSI deviation exceeds certain values from the desired set value, modification of the signal strength will be implemented. This as in earlier discussions prevents oscillation of the transmitter power levels and potential link layer structure of the network. Thus, if the RSSI is acceptable, "YES" is selected at decision box, 68, and at 65, the node is being readied for the next data packet transmission at 60. If, however, the RSSI is outside acceptable boundaries, at decision box, 68, "NO" is selected and at decision box 69, it is determined if the RSSI is greater than or less than said ideal RSSI value. If the RSSI is greater than the desired RSSI, "Greater Than" is selected and at box 70, the power setting at the node is lowered by an amount that will bring the RSSI as close as feasible (typically, in most networks, power increments and reductions are not continuous) to the ideal RSSI.

The new power level setting is stored in the routing list at 71 (for the routing list directed at the node that sent the last SCMM), and the node is returned at 72 to box 60, readying the node for the next packet transmission. When the RSSI is less than the ideal RSSI, "Less Than" is selected at decision box 69, and at box 73, the power setting at the node is increased by an amount that will bring the RSSI, as close as feasible, to the ideal RSSI value unless the node is at the maximum power where the receiving node should be noted as having reduced transmission capacity in the routing table. The new power setting is then stored as part of the routing list at 71, and at 72, the node is returned to 60, readying it to send the next packet transmission.

Apart from the capacity of a target node first on the routing list, and the optimal power setting to reach such a node, it is important that such a target node will not be too busy transmitting packets from other nodes in the link layered network, nor is it desirable to use as a repeating node, a node that might have local technical problems. Therefore, in the practice of the present invention, a unique parameter which we have termed "node utilization factor" is designed and used in determining whether a node would be used or not in a routing list.

Figure 6:
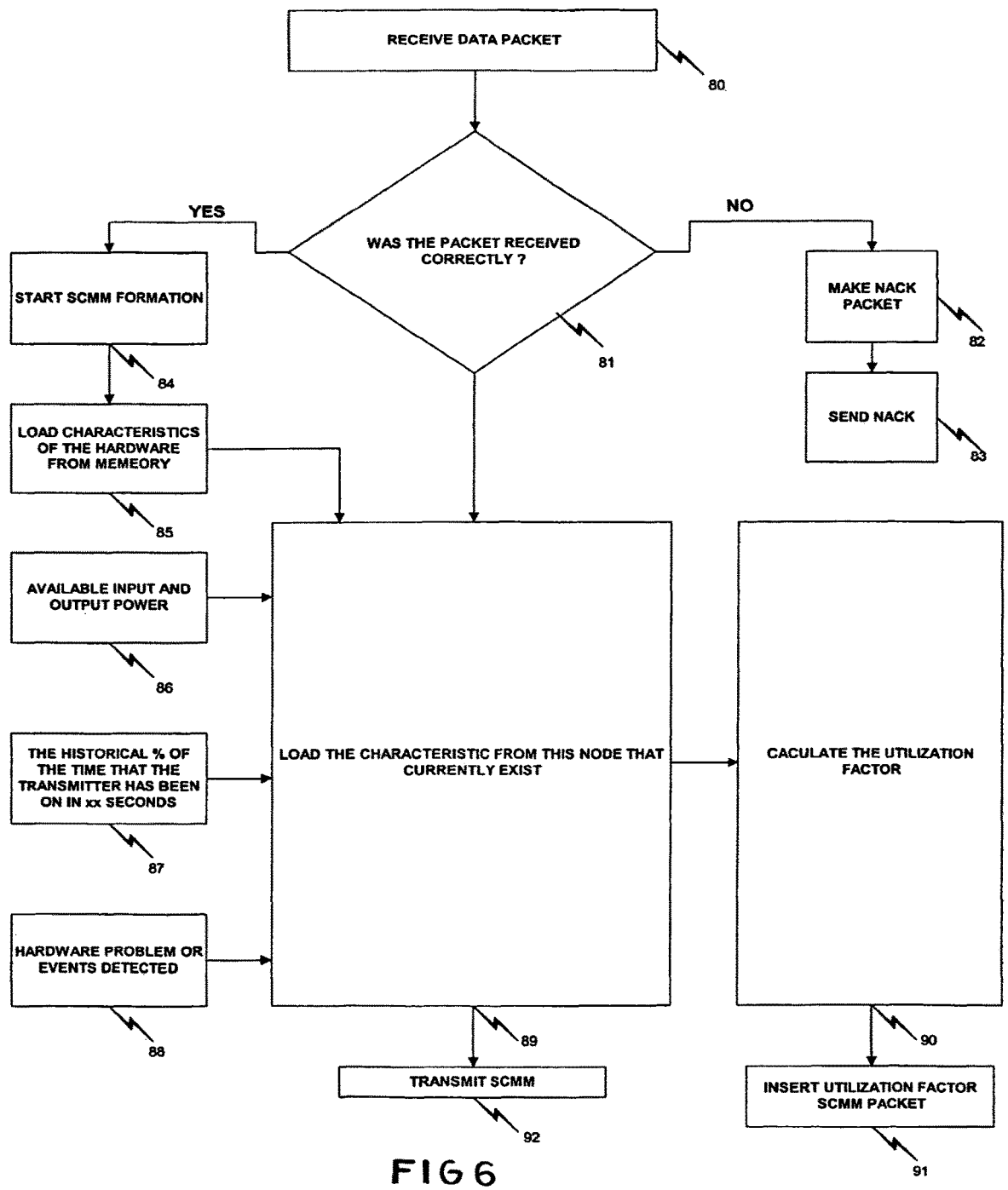
FIG. 6 is a logic diagram describing the process of calculating a utilization factor.

The algorithm describing how the utilization factor is derived is shown in FIG. 6. Specifically, at 80, a data packet is received and at decision box 81, it is determined if the packet was received correctly. If the node had reception problems with said packet, "NO" is selected and a NACK (no Acknowledgment) packet is prepared at 82 and sent at 83. If the packet was received correctly, "YES" is selected at decision box 81 and at 84, the start of an SCMM formation is executed (it includes amongst other things, "Capacity Notification" as in FIG. 4, determination of the RSSI as in FIG. 5, Frequency Adjustments as in FIG. 8 and Time Synchronization as in FIG. 9).

The utilization factor which is calculated at 90, consists of three main elements. The most important is the historical percentage of the total elapsed time that the local transmitter is busy transmitting packets and is calculated at 87. This historical time frame is arbitrary, in some embodiments of the invention, that percentage is being averaged over the period from the last "power-up" of the node. In most cases, a rational moving average over a period of few hours is a better value for the percentage of the time the transmitter at the node is on. In very active networks, shorter time intervals are used as moving averages to determine said percentage.

Let's reconsider FIG. 1 and concentrate on the nodes of the type "12". As shown in that figure, the central node, 10, is positioned south of a ridge (or it could be another type of geographical obstruction) with the node 101 serving as a link between nodes in the northwestern quadrant of the system and the central node. Typically, node 101 will be in the routing list of nodes 102, 103, 104, 105 and 106, and relays messages to the central node, 10, either directly, or through node 109. That may cause node 101 to become over utilized, and may even cause clogging of the network at that location. In the practice of the present invention, such overburdening of a repeater node is avoided by including in the SCMM from node 101, a utilization factor, reflecting the rate of utilization of that node. If the rate exceeds a preset value, traffic, for instance, from nodes 105 and 106, may be rerouted through nodes 107, 108 and 110 to the central node, thus lowering the load on node 101.

The result will be de-optimization of the number of hops from 105 and 106 to the central node, yet preserving the network overall optimal utilization of the available RF spectrum in that geography. Note that typically, node 109 will have a link layer, 1, 101 a link layer 2, and nodes 102, 103 and 104, which will still be using node 101, as a repeater to the central node, have a link layer 3 (It should be noted that if node 101 communicates directly with the central node, 10, its link layer level will be 1, and the link layer level of nodes 102, 103 and 104 will be 2). Nodes 105 and 106 would also have a link layer of 3 if they used node 101 as their route to the central node, however, when 101 is already overburdened, node 106 might have a link layer of 4 (going through 107, 108 and either 110 or 109), and node 105 might even have a link layer 5, if it cannot communicate directly to 107 and need to use node 106 as an intermediate repeater.

A typical rate of packet processing at a node that would instigate change in routing, would be latency in the range of 0.333 to 0.666. Namely, if a node is busy repeating packets between ⅓ and ⅔ of the time, it should not be included in additional nodes routing list and marked as a high utilization rate node. To ascertain that a node is indeed a high quality node to be used in the retransmission of packets from nodes having higher link layers, it is important that other characteristics of the node be optimal. Thus, if the node in question may have power limitations, for instance if powered from a battery or another limited power source (such a solar cell powered battery system), such limitations become part of the utilization factor of that node. Such potential power limitation is recorded at 86 and is used at 90 to calculate the eventual "Utilization Factor". Similarly, if the nodes might have any hardware problems or local events that could interfere with its ability to serve as a repeater, such is noted at 88 and used at 90 as well to calculate the eventual Utilization Factor.

The end value of the Utilization Factor, is typically the arithmetic sum of the utilization rate determined at 87, the available power determined at 86 and the occurrence of hardware problems or special local events determined at 88, as well as the native capability of the nodes hardware as defined in 85. In order to ascertain that local failure of either the power, or major local hardware problems, do not interfere with the ability of the network to keep operational, the input from unacceptable levels of node functionality determined at 86 and 88 is set usually at around half the threshold, U (between 0.333 and 0.666) for the Utilization Factor. This result in that node being taken off the routing list long before the utilization Factor alone causes such a rerouting to occur, assuring the continuous readjustment and optimization of routing in the link layer network at all times.

Once a node has attached to each SCMM its own Utilization Factor, in FIG. 6, at box 91, and the SCMM is transmitted at box 92, the node that elicited the SCMM can determine if that node is to be used in further future repeats of packets and include said note in its routing list. In some embodiments of the present invention, the "utilization Factor" is a "unique" parameter, namely, only the node that elicited the SCMM will react in the event that the utilization factor exceeded the predetermined threshold, U. In other embodiments of the invention, the Utilization Factor is considered a "universal" parameter, and all nodes that receive the SCMM reacts to an excessive utilization factor.

Figure 7:
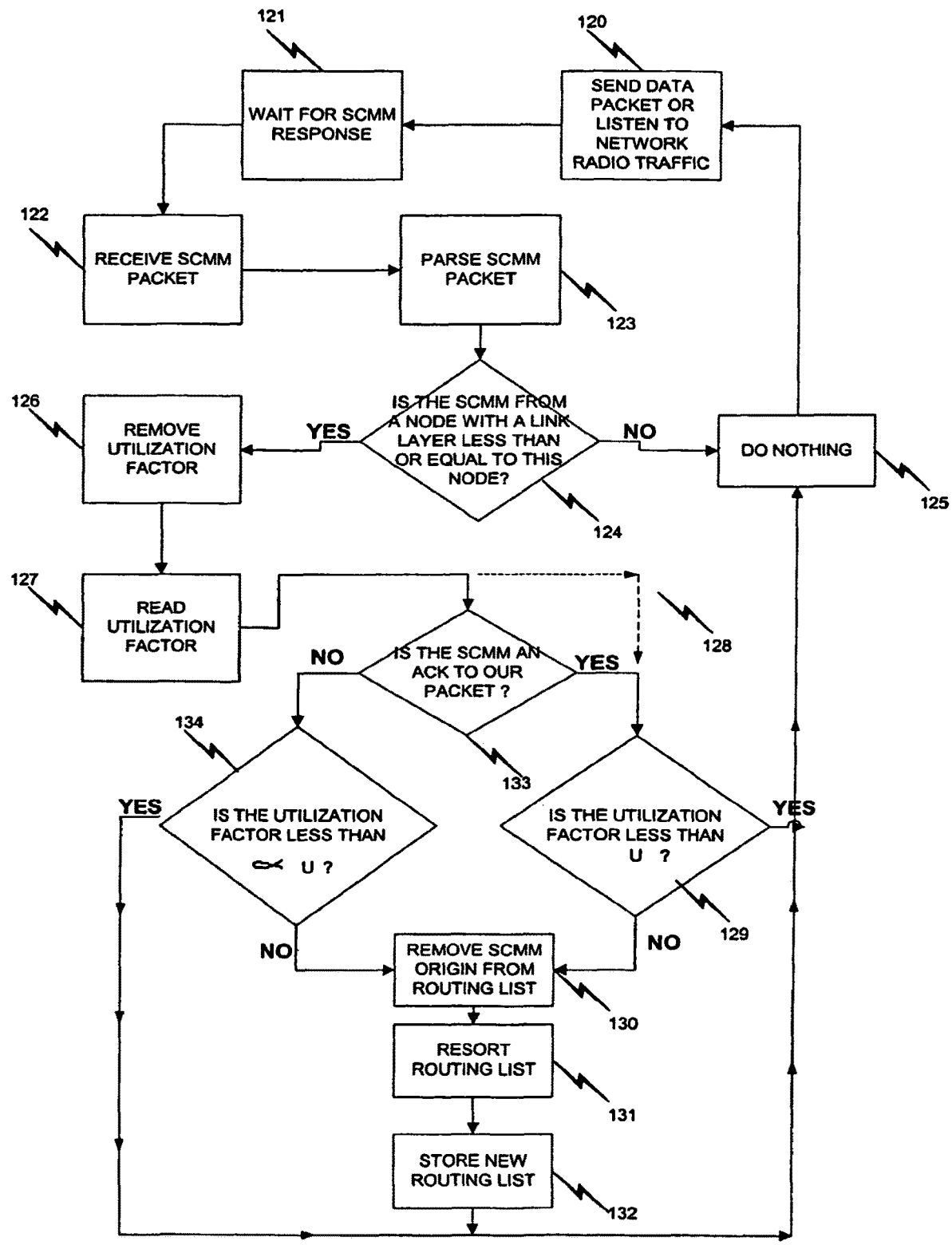
FIG. 7 is a logic diagram of rerouting due to excessive utilization.

This is done as described in FIG. 7, which for simplicity presents both the embodiment in which the Utilization Factor is treated as a unique parameter and the embodiment where the utilization factor is treated as a universal parameter. Specifically, at box 120, a data packet was sent, or the node simply listens to the network radio traffic. An SCMM generated at 92 is awaited for and received at 121, received at 122 and parsed at 123. At decision box, 124, it is, once more, ascertained that the SCMM is not an SCMM(−), thus has come from a node having a link layer lower than the local node, if the SCMM is from a node with link layer greater than the local node, "NO" is selected, nothing is done at 125 and the node is readied to send another packet, or listen to the network at 120.

If however, the node from which the SCMM was sent has a link layer equal or less than the local node, then "YES" is selected at box 124. At box 126, the utilization factor is removed from the SCMM and read at box 127. up to this point, the algorithm implementing the utilization factor test is the same in embodiments of the invention that consider the utilization factor a unique or a universal parameter. If one wants to implement the utilization parameter as a unique parameter, namely, only the node eliciting the SCMM response is to act on the then current value of the utilization factor, the branch denoted 128, is taken, and decision boxes 133 and 134, simply do not exist in that embodiment. At decision box 129, the utilization factor from the incoming SCMM is compared to a fixed threshold value "U" (typically between 0.333 and 0.666), if it is less than "U", "YES" is selected at box 129, and going through 125 (do nothing), the node is readied to transmit the next packet and no change in its routing list is made.

If, however, at decision box 129, "NO" is selected, namely the utilization factor logged onto the SCMM is greater than "U", then at box 130, the origin of the SCMM is removed from the local node's routing list, and the routing list is resorted at 131. The new routing list is now stored at 132, and at 125, the node is readied to send the next packet.

As mentioned above, in some embodiments of the invention, the utilization factor contained in the SCMM is treated as "unique" data, namely, only the node that sent the packet to which the SCMM is an acknowledgment acts on the utilization factor received. This is to assure that not all nodes that use the repeater that sent the SCMM, act simultaneously to remove that node (for instance, node 101 in FIG. 1). In FIG. 1, at least five nodes will receive (or "hear") an SCMM from 101, but only one node at a time should remove 101 from its routing list if the utilization factor exceeds "U". If all the nodes (102, 103, 104, 105 and 106) that can hear the SCMM change their routing list simultaneously, suddenly, 101 will no longer be "over utilized" and the network may be thrown into unnecessary oscillations, in the process of seeking new routing lists.

In other embodiments of the invention, the utilization factor is treated as "universal" data, namely, all nodes receiving that SCMM, whether or not the SCMM is in response to their own sent packet, reacts to remove the node having an excessively high utilization rate from their routing list. The decision if the utilization factor is "universal" data or a "unique" data is determined by the nature of the network. Typically, when it is desired to make the utilization factor "Universal" data, two additional decision boxes are used, 133 and 134 as shown in FIG. 7. In such an embodiment, the goal is to remove from the routing lists of all the nodes that receive the SCMM, whether or not such nodes elicited said SCMM, a node that has become, not just over utilized, but which also suffer from other problems, for instance, power limitations, or local hardware failures. Thus, in the embodiment of the invention where the utilization factor is universal data, branch 128 does not exist, and instead, after reading the utilization factor from the SCMM at 127, the program goes to decision box 133 where it is determined whether the SCMM was elicited by the local node (Ack to our packet?) or not. If the SCMM was elicited by the local node, "YES" is selected at decision box 133, and the data are treated as if the utilization factor is unique data (through decision box 129 as described above).

If at decision box 133, it is determined that the SCMM was not elicited by the local node, "NO" is selected, and at decision box 134, the utilization factor is compared to a threshold value $\alpha U$, where a is typically greater than 1. If the utilization factor is less than the new and higher threshold value $\alpha U$, no problems are "considered" encountered with that node, and thus the system returns to 125, "do nothing", and then back the listening to the network at 120. It should be noted that for nodes that did not elicit the SCMM, even if the utilization factor exceeded the threshold value, U, no action is taken. This, since the node that elicited the SCMM will remove the origin of the SCMM from its routing list, and that might be sufficient to reduce the utilization factor of that node below the threshold in subsequent time intervals. If the utilization factor of the SCMM origin is not reduced sufficiently, the next node eliciting an SCMM from that same SCMM origin will cause further reduction in its utilization rate, until the utilization rate declined under the threshold value U.

In this manner, when a situation arises that a critical node has deteriorated markedly, resulting in a very high utilization factor, greater than the normal threshold value U (typically due to hardware problems or power problems), no delays in reconstituting the link layer network occur and immediate reaction of the network is obtained when all nodes that were using the, now faulty, node in their routing list, seek alternate routes.

There is an additional parameter that can impact efficiency as well as the optimal operation of a link layered network, particularly when such a network includes older technology nodes. With time, a transmitter's frequency, which is derived from a quartz crystal, can slowly drift, and when the frequency increases or decreases beyond specific limits, it can actually cause the transmitter to broadcast outside the allowed band (allowed by the FCC, or as it is commonly known the "occupied frequency mask").

Furthermore, the farther the frequency is from the central frequency of the network, the more bit losses and even packet losses occurs. It is therefore important to maintain the frequency used to transmit packets at each node of the link layered network, as close to the system or the central node's frequency as possible. Since none of the subscriber nodes are usually equipped with accurate frequency standards, the only way to assure that frequency drifts in the system do not reach excessive levels that interfere with the system operation, is the comparison at each node of its frequency with that of lower link level nodes. That process as well is carried out via the SCMM.

Figure 8:
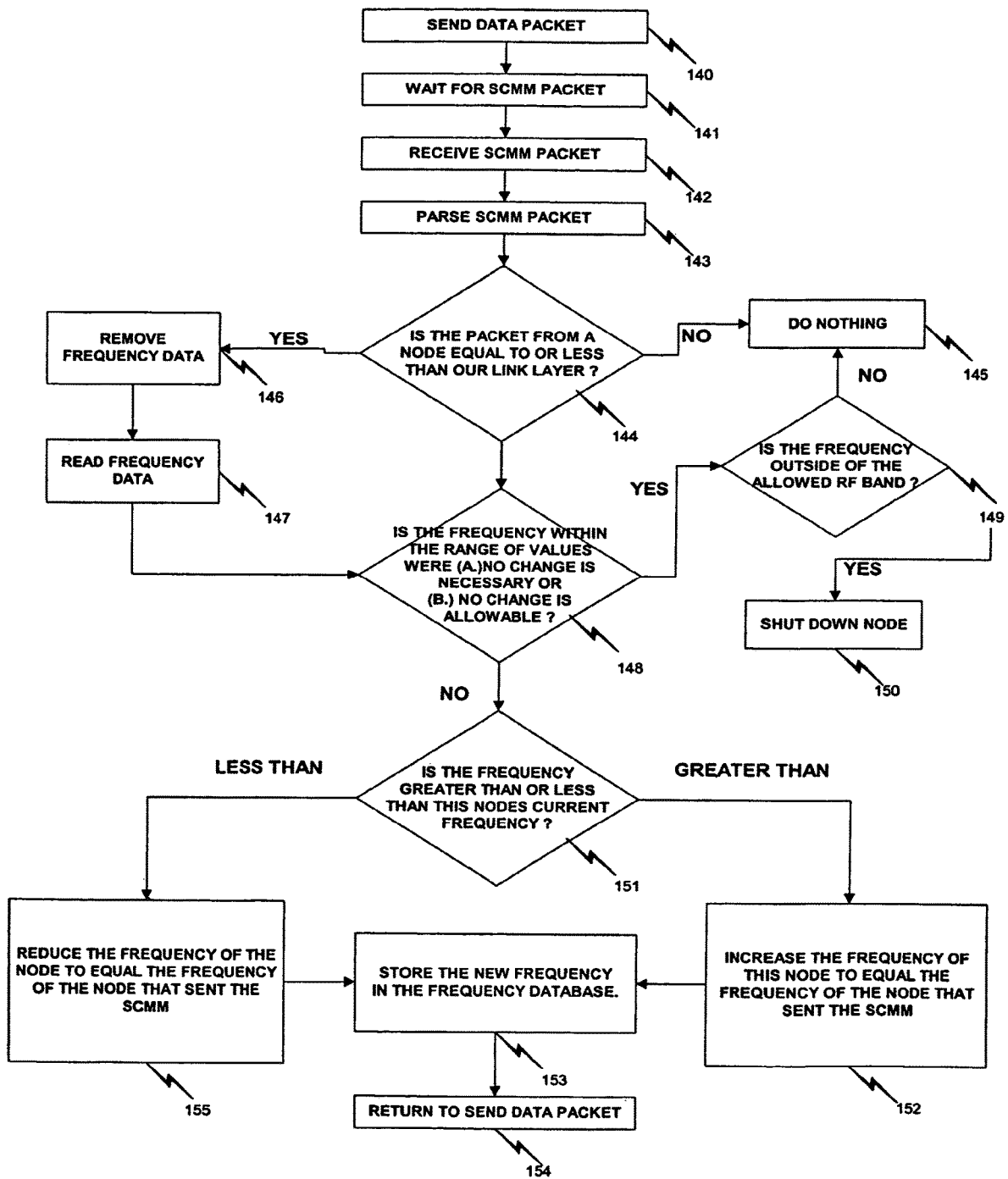
FIG. 8 is a logic diagram implementing system wide frequency standardization.

Specifically, in FIG. 8 is shown the flow diagram and algorithm through which frequency standardization is carried out. As before, with the capacity utilization, signal strength and utilization rate, at 140, a packet is sent and at 141, the node awaits an SCMM. At 142, the SCMM is received and parsed at 143.

At decision box 144, it is ascertained that the SCMM is from a link layer equal to or less than the local node. If the origin of the SCMM has a higher link layer, the SCMM is a SCMM (−) and "NO" is selected at 144, and at 145, nothing is done and the node is readied to transmit the next message at 140. This, as before, with capacity, signal strength and utilization rate, assures that all changes in frequency are promulgated through the network from lower link layers to higher link layers. If the link layer of the SCMM origin is less or equal to that of the receiving node, "YES" is selected at 144, and at 146, the frequency data of the SCMM originating node are removed and read at 147.

At decision box, 148, the local frequency is compared to the originating node's frequency. If the local frequency is very close to the originating node frequency and thus no change is necessary, "YES" is selected at 148. "YES" is also selected if the difference in frequency is extremely high, and outside the allowed RF band for that frequency, and in essence no change is either feasible or allowable. That case will, in most situations, be due to a major hardware failure occurring at the node, necessitating shutting down the node and servicing it. Thus at decision box 149, if the frequency at the local node is outside the allowed RF band, "YES" is selected, and the node is directed to shut down at 150. If the frequency is not outside the allowed RF band, then it must be very close to the SCMM originating node's frequency, "NO" is selected at decision box 149, going to 145, where "do nothing" is 15 implemented and the node is readied at 140 for the next packet transmission.

If at decision box 148, it was determined that the frequency of the node originating the SCMM is different enough from the local node's frequency, but the difference is not so great that the local node need to be shut down, "NO" is selected. At decision box 151, it is then determined if the frequency of the originating node is "Greater than" or "Less than" the frequency of the SCMM's originating node. If the SCMM node's frequency is greater than the local node's frequency, "Greater than" is selected and at box 152, the frequency of the local node is increased to equal the frequency at the SCMM originating frequency. The new frequency is now stored in the local node frequency data base (essentially in the form of a multiplier or a factor of the local crystal frequency) at 153, and at 154, the node is readied to send the next data packet.

If the SCMM node's frequency is smaller than the local node's frequency, "Less than" is selected and at box 155, the frequency of the local node is reduced to equal the frequency at the SCMM originating frequency, and as before at 153, the new frequency is stored and at 154 the node is readied for the next transmission.

Since there are a number of system commands that are executed at the various subscriber nodes at predetermined time intervals, or specific commands that are broadcast to the network for execution at future times, it is important that all nodes in the link layered network have their local clocks synchronized with the clock at the central node.

Figure 9:
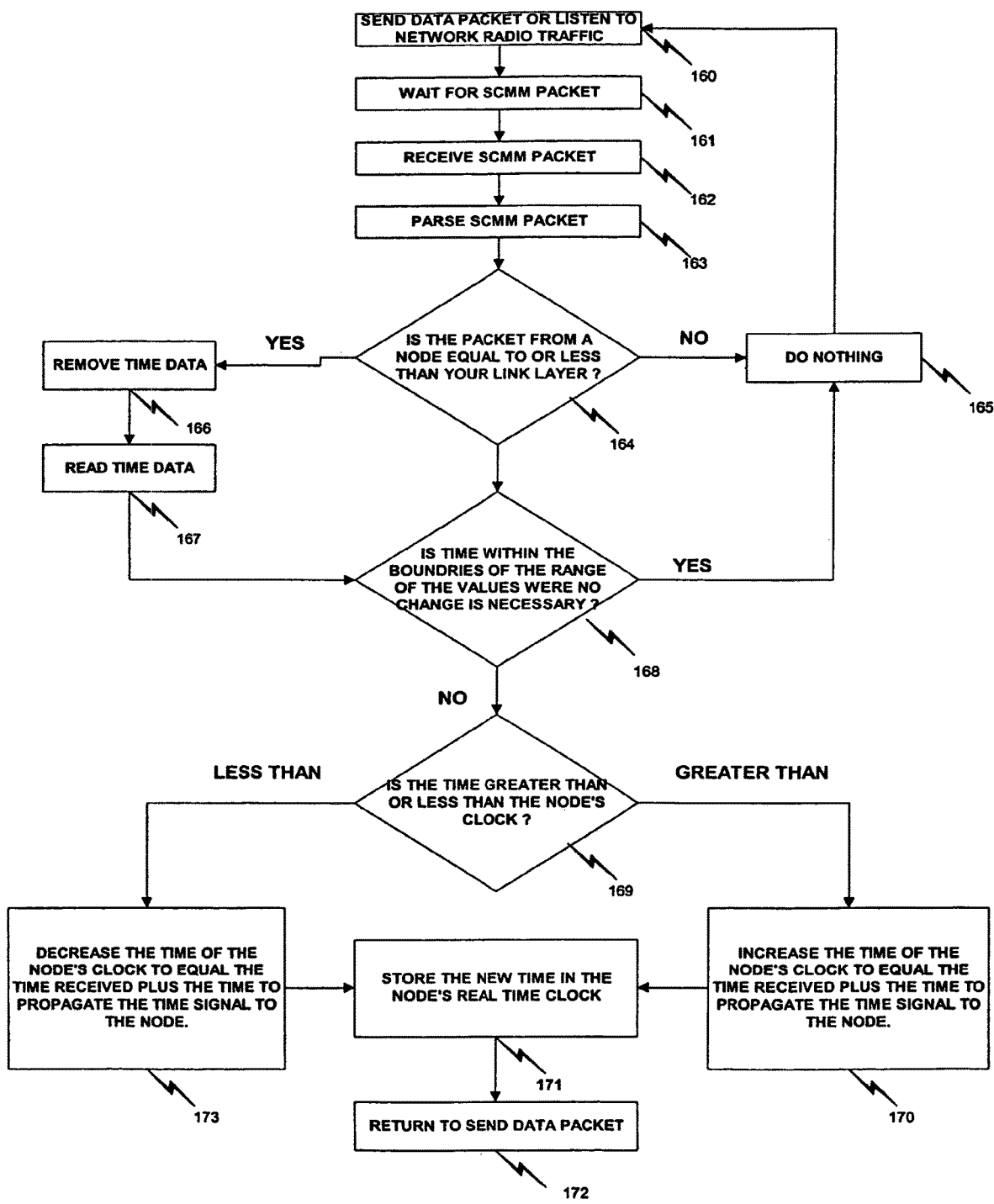
FIG. 9 is a logic diagram implementing system wide time synchronization.

The SCMM of the instant invention in conjunction with the algorithm described in FIG. 9 provide for such time synchronization. Since the time is a "Universal" parameter, all nodes that "hear" an SCMM will check their clock against the clock at the node of origin of the SCMM, even if the nodes did not send a packet instigating the SCMM acknowledgment. Specifically, in FIG. 9, at 160, the node either send a packet or is listening to the network radio traffic to capture an SCMM which is not necessarily an acknowledgment to its own message. At 161 and 162, the SCMM is waited for and received and parsed at 163.

It is necessary, as with other parameters discussed above, to promulgate the "right time" from lower link nodes, or even from the central node toward the extremities of the network having higher link layers, thus at decision box 164, we eliminate SCMM(−) that are "heard" at the node, by checking if the SCMM packet is from a node having a link layer less or equal to the local node. If "NO" is selected, the SCMM is from a higher link layer node and thus at 165, nothing is done, no change in the local clock is implemented and the node is returned to 160. If "YES" is selected at decision box 164, the time data are removed from the parsed SCMM at 166 and read at 167.

At decision box 168, the time data from the SCMM is compared to the local nodes' time. If the value is within predetermined boundaries which do not require any change in the local clock, "YES" is selected at decision box 169, and at 165 "do nothing" is implemented and the system is readied for the next transmission at 160. By allowing for defined variations in the clocks of all the nodes in the network we prevent oscillation of each node's clock.

If, however, the value of the time data read from the SCMM is outside said boundaries, "NO" is selected and at decision box 169, it is determined if the SCMM time stamp is greater or smaller than the local clock's time. If the SCMM time stamp is greater than the local time, "Greater than" is selected, if lower, than "Less than" is selected.

When "Greater than" was selected at box 169, at 170, the local time is increased to match the time read from the SCMM, plus a time interval, which is the time of propagation from the SCMM's originating node to the local node. The new time is now stored at the local node at 171, and at 172, the system is readied (160) to send the next packet, or listen to the network radio traffic.

The propagation time may be a set constant, it may be a set constant that varies per link layer, or it may be the actual time the packet took to reach a node. This actual time would be included in the SCMM packet.

When "Less than" is selected at box 169, at box 173, the local time is decreased to match the time read from the SCMM, plus as before a time of propagation. Here as well, the new time is now stored at the local node at. 171 and the system is readied at 172 for the next packet transmission, or listen to the network radio traffic.

Following the algorithm described in FIG. 9, assures that at all time, the local node, even if it has not sent a message out for a long time, has in its clock a time synchronized with the rest of the link layered network.

Under some circumstances, particularly, when a critical node is lost and a group of subscriber nodes is temporarily isolated from communication with the central node, a link layered network will have a tendency to "bloom." The term "blooming" is used for situations when the lack of completion of a successful transmission of a packet from a remote subscriber to the central node causes that group of nodes to send a large number messages within the group. This is done automatically, in an effort to reestablish communications with the central node, and in the process, each node involved keeps raising its own link layer, as taught in '569, in a futile attempt to reestablish communications. In essence a loop is created in which the link layer levels of some or all the nodes in that isolated group keeps increasing, and messages that were sent by a node return back to it, with no way found to the central node. Since such an event creates a lot of excessive traffic, it is important to rapidly filter out such repeated messages, until the route to the central node is reestablished or an alternate route is established.

Figure 10:
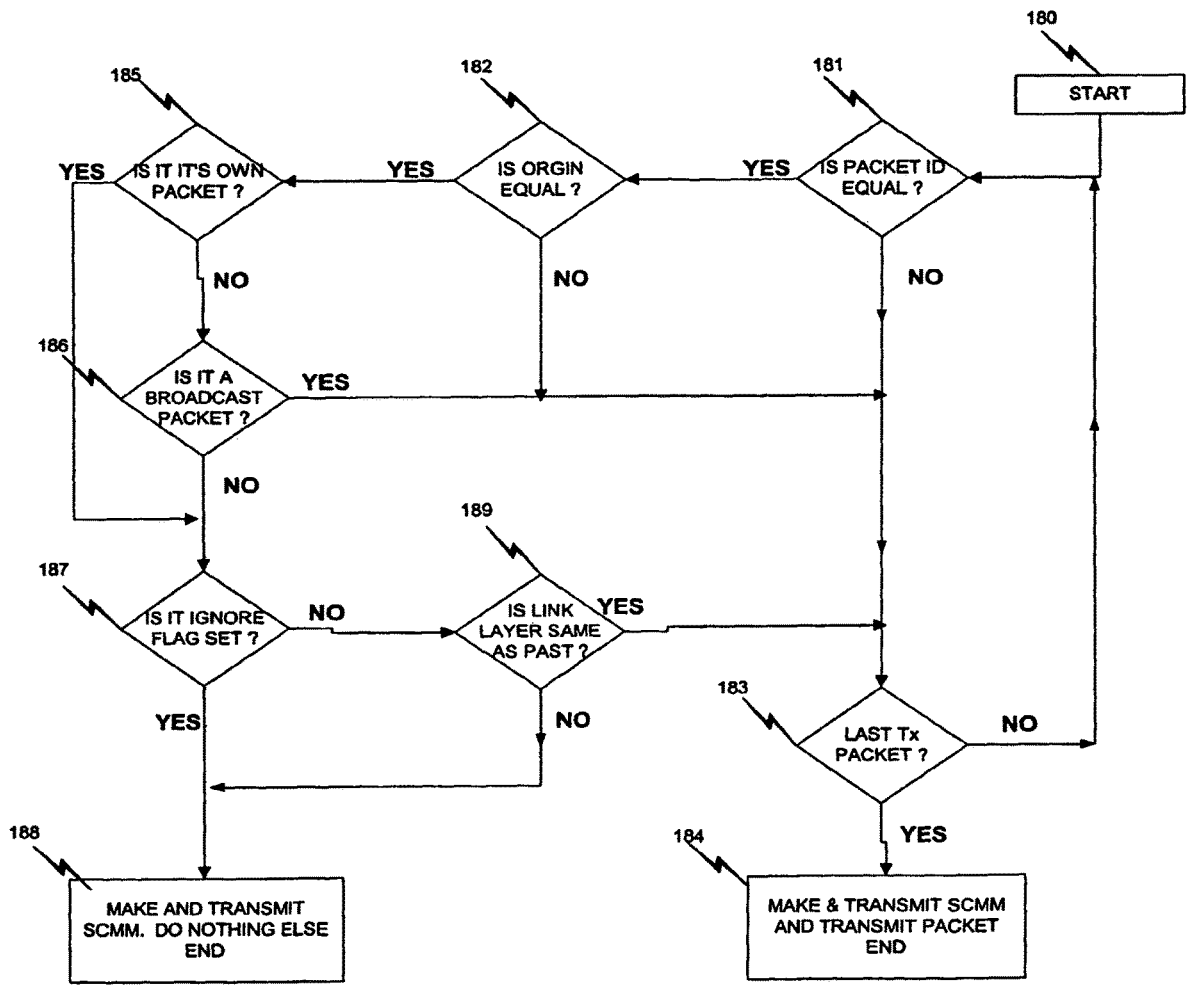
FIG. 10 is a logic diagram of loop formation prevention.

FIG. 10 describes an algorithm designed to assure that looping and the resulting blooming of link layers is not allowed to continue. Specifically, at the "Start", 180, the node listens to the network radio traffic, and as described in '569 and '236, determines if a packet is addressed to the local node. In '569 when a local node queued a packet for retransmission, an ignore flag was set (typically the ignore flag expires after a preset time, about 3 minutes). Packets not addressed to the local node are disregarded and at decision box 181, and 182, the packet received is identified by its sequential number, or packet ID, and by its origin.

If the local node does not find in its recent list of packets sent an equal sequential number or ID number, the packet is not involved in a loop and "NO" is selected at 181. At decision box 183, the node determines if the received packet is the last one on the transmission list Tx.

If at decision box 183, it is determined that the packet is the last on Tx, the test for looping or the filtering test is ended, the packet is acknowledged with an SCMM and the packet is transmitted to the next node at 184. If there are other packets queued ahead, the node gets back to the start of the filtering process.

If at decision box 181, "YES" was selected, namely a recent packet with the same sequential number was recently handled at the local node, at decision box 182, the node checks if the origin of the packet was also equal to a prior packet having the same sequential number. If "NO" is selected, at 183 the packet is either transmitted (if it is the last on Tx and an SCMM is also transmitted at 184) or the system wait until the packet reaches the top of Tx.

If both the sequential number of the packet and the origin of the packet are equal to those of a prior packet, we still try to "salvage" the situation, if the packet was a "broadcast," namely, a packet that need to be transmitted "at any cost," including the danger of network blooming. Thus at decision box 185, if the test "Is it our packet" fails, "NO" is selected, Because it is desired to treat "Broadcast Packets", which usually contain important commands to all the nodes, or at least a large subgroup of all the nodes, in the link layered network, at decision box 186, the query "Is the packet a broadcast" is posed, to see if the packet is a "broadcast" or not. It the packet is indeed a "Broadcast", "YES" is selected at 186, and despite the obvious problems identified before, the packet is still queued at 183 and if it is the last packet on Tx, for acknowledgment and retransmission at 184. If the packet is not the last on Tx' it goes back to "start" (180), until it becomes the top of Tx.

If the packet is not a broadcast, it must be a packet from another node, for retransmission, that somehow has come back after it was retransmitted earlier and thus possibly a nascent loop is formed. Such a repeated packet is treated like a repeated packet generated locally. If at 185, it is determined that the packet originated at the local node, and is thus definitely a possible looping process is in progress, "YES" is selected at 185, which may eventually lead to acknowledgment (at 188), but with no retransmission.

At decision box 187, repeated packets, whether originating locally or elsewhere, as long as they are not "Broadcast Packets", and thus simple data packets, we check if the "ignore flag" (set earlier on the first transmission of that packet) is still on. If the "ignore flag" is still on, the packet is acknowledged with an SCMM, but not retransmitted at 188, since that packet, a very short while ago, was sent from the local node and has returned through a looping process. By not re-transmitting the package, the loop is interrupted, however, the packet is lost. Yet, the network is prevented from going into a lengthy set of packet transmissions that occupy the airwave and prevent reconstitution later, of the appropriate routings for the various nodes.

If the "ignore flag" is no longer set, it means that it has been some time (at least three minutes) since the packet was transmitted, "NO" is selected at decision box 187, and decision box 189, we check if the link layer attached to the message (from the last re-transmitting node) is the same as the last time the packet was handled in the local node. If it the same, no blooming, or no increase in link layers of neighboring nodes has occurred, thus most likely, the repeat was simply accidental. At 189, "YES" is selected, and another attempt to retransmit the packet is conducted at 183, after assuring the packet is at the top of the transmitting list, Tx. If, however, it is found at 189 that the link layer is different (and it has to be greater than last time, due to blooming), and the packet must have returned after some nodes attempted to reestablish connectivity to the central node by incrementing their link layer levels, "NO" is selected at 189. That will cause acknowledgment with an SCMM of the receipt of the packet at 188, but no transmission of the packet, thus interrupting the blooming process.

In this manner, temporary disconnection or failure of some critical nodes in the system, will not result in the incessant transmission of messages within the system in a futile attempt to reestablish connectivity. Once the fault in the system is taken care of, reestablishment of various routing lists from the last routing lists at each node can be accomplished, without the process of blooming corrupting the routing lists at a large number of nodes.

As mentioned earlier, there are occasions when a link layered network suffers total or partial power failures leading to shut down of a large number, if not all the nodes in the network. In the prior art, upon power restoration, all nodes would send out a "Discovery" packet if their routing lists were no longer valid, and often that would cause flooding of radio space with the packets and acknowledgments from a large number of nodes, making it very difficult to reestablish a rational routing lists at all nodes in the network. In order to overcome that problem, a stratified awakening with priorities is established in the present invention, that assures the gradual wakeup of the network, without crowding of the airwaves with unnecessary traffic.

Figure 11:
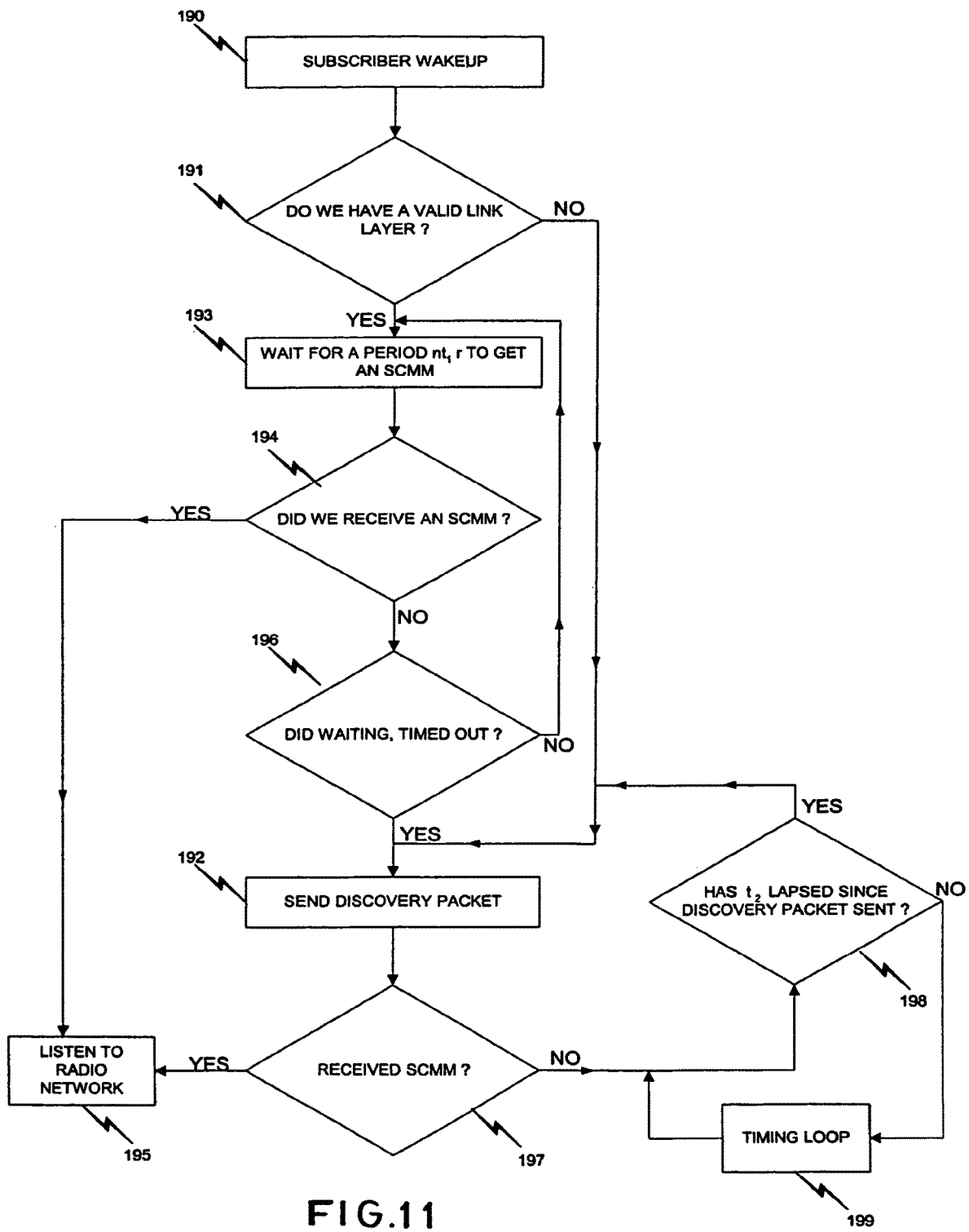
FIG. 11 is a logic diagram implementing stratified awakening of the network.

FIG. 11 shows an algorithm that provides for such stratified awakening of the network. At 190, a subscriber is powered up, after a presumed black out, or a rolling black out. At decision box 191, it is determined whether the node has a valid link layer. The node might be a "new node" and thus not have a link layer, it may have also lost its routing list due to the previous unique event that shut down the network. It should be understood, that most nodes will still have a valid routing list in their memory. However, if it is determined at 191, that the node does not have a valid link layer, "NO" is selected at 191 and a "discovery packet" is transmitted at 192. The nature of the "discovery packet" was described in detail in '569 and '236 of the present inventor, and said description is incorporated herein.

If at decision box 191, it is determined that the node has a valid link layer (and thus, of course, a valid routing list), and at box 193, a timer flag is set for a delay of $nt_1r$, where n is the node's link layer level, $t_1$ is a predetermined time interval (between 30 seconds to 120 seconds, typically we use 65 seconds), and r is a random number, typically between 0.5 to 1.5, but can be well outside of that range in unique link layered network. The delay time $nt_1r$ creates temporal windows in which nodes having the same link layer reestablish their routing lists. The process therefore stratifies the awakening of the network, and spread it in time from lower link layers to higher link layer. The random number factor (typically with up to two decimal points, but with networks having thousands of nodes more decimal points can be used to provide for a more refined "staggering" of the wake up radio traffic.)

At decision box 194, during the delay period of $nt_1r$ the node continues to listen to the radio traffic in the network, and if it received any SCMM, which is congruent with its then existing routing list, it goes back to box 195 to listen to the network. if it is not congruent with its routing list, the list is modified according to principles taught in '569 and the node goes to listen to the network at 195. That node is now back in the network.

If, however, no SCMM is received, at box 194 "NO" is selected and at box 196, it is determined if the set delay time $nt_1r$ has lapsed or not. If the delay time has not been waited out yet, we go back to 193 to wait out the set delay time, and repeat the process, until the delay time $nt_1r$ has lapsed. Once the delay time $nt_1r$ has lapsed, "YES" is selected at decision box 196, and at box 192, a discovery packet is composed and transmitted. The system now sets up a second fixed delay time, $t_2$ (typically around 30 seconds) and at decision box 197, we check if any SCMM has been received. If such an SCMM was received at the node, "YES" is selected at 197, and the node is now with an effective routing list and goes back to listen to the network at 195. If, however, no SCMM was received at 197, "NO" is selected and at decision box 198, we check if the delay time $t_2$ has lapsed or not. If it has not, we go into a timing loop at box 199 which in essence waits until the period $t_2$ from the sending of the discovery packet at 192 lapsed or not. Once that delay time lapsed, "YES" is selected at 198. That means that the last discovery packet elicited no SCMM response, and there is therefore a need to send a new discovery packet at 192, until an SCMM is finally received and the local node is integrated into the link layered network. It should be noted that in order to validate the link layer found in box 191, any SCMM, whether from a node up or down the hierarchy of the link layer network will suffice. That is done to assure that the number of discovery packets transmitted upon a network awakening is minimized.

It should be obvious that while the awakening algorithm was designed to minimize radio traffic post major failure or restarts of the network, the same algorithm is used at any node if it is either a new node, or a node that lost power on its own, without the whole or major parts of the network failing. In essence, a node does not "know" if the whole network is down or not, and thus that algorithm is used whenever a node is re-powered.

Example

One example where a link layered network of the present invention is particularly useful, is in a city setting, where a large number of buildings contain each a plurality of systems that need to be monitored. In some instances, the monitoring is localized at each building, but in many cases it is also desired to have such monitoring and control function localized and away from each building. There are also embodiments where such monitoring and control is both local at each building or some of the buildings and remote from a central control station.

Figure 12:
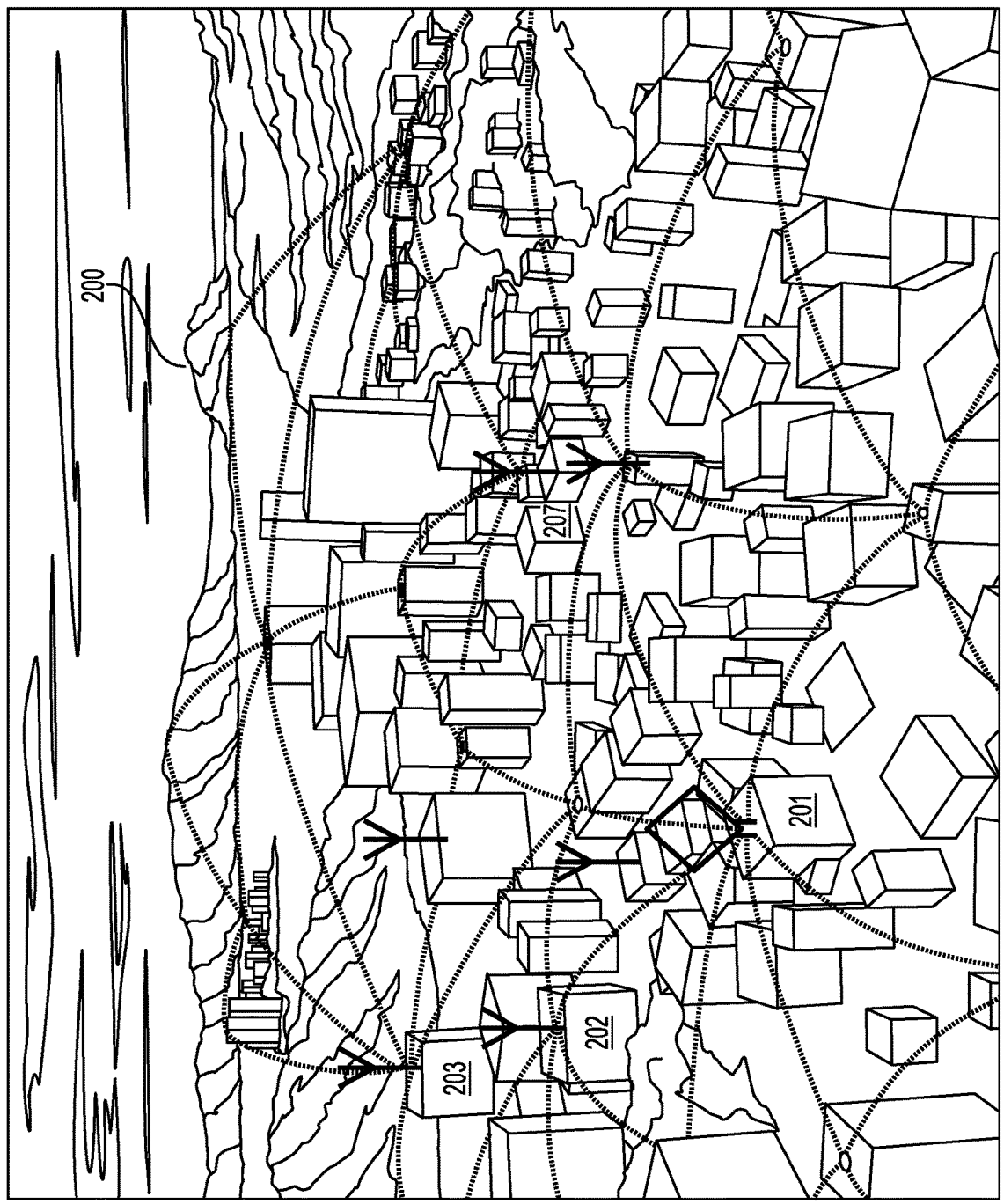
FIG. 12 is a diagram of an application of the invention.

Thus in FIG. 12 there is shown a link layered network 200, having one central node 201, and a plurality of nodes (202 to 207), each one associated with a unique building. Data monitored are varied and include amongst others, metering of power use and electric loading, metering of natural gas use and water use, and these not only for the whole building but as sub-metering for each tenant in the building. Typically, each metering point will have a secondary node associated with it (these nodes are not shown in FIG. 12, for simplicity), and from time to time, such a secondary node within a building will transmit data to the building's main node (for instance, nodes 202 to 207). Other relatively simple systems, associated with paucity of data transmission requirements may be associated with water level monitoring systems or fault annunciation (associated with various functions, such as water towers, chillers and even central steam generators).

Such buildings may also have independent energy management and control systems with a plurality of monitored points, each such monitoring point will also have a secondary node associated with it, to transmit the information gathered. Obviously, data density associated with such energy management systems might be higher and have greater frequency of transmission requirements than data associated with relatively simple metering systems.

In yet some other buildings, there might be a "SCADA" (Supervisory, Control and Data Acquisition) system having associated with it its own secondary node or nodes, transmitting data to the building's main node, to be repeated by other main nodes until such data stream reaches its destination at the central node.

Other data that could be transmitted in the link layered network are related to electronic security and surveillance systems of various kinds, from simple data stream associated with intrusion detection, to more complex video images. Obviously, different type of systems are associated with different data densities, but clearly, the data density transmission requirement would be much higher for SCADA and various video security systems than for metering devices and simple intrusion alerts.

Typically, the only communication route to the network 200 from secondary nodes in a given building would be through the main node associated with each building (for instance nodes 202 to 207). Communication from remote nodes (remote relative to the central node 201) to the main nodes, will be, more often than not, through a series of other building nodes with the ultimate destination the central node.

A complex network as described in FIG. 12 is often the result of the consolidation over many years of nodes having different technologies, packet capacities, broadcasting power etc. into a single network. The network of nodes also has to accommodate future nodes not yet available or even conceived of yet. Thus if we look for instance at a main node 202 in FIG. 12, it may have older technology, and is quite acceptable for transmitting infrequent and short messages from a large number of secondary nodes (not shown) within the building, relating to water levels and even meters readings. However that node 202 cannot be used by the main node 203, which is associated with more modern secondary nodes in the building transmitting higher capacity packets, for instance, from a SCADA system, or a video security surveillance systems. Thus, due to its higher packets capacity, the main node 203 messages reach the central node 201 through node 205. This is accomplished automatically in the link layered network of the present invention as described above. Furthermore, if node 205 would become incapacitated either due to power failure, or even due to excess utilization, the system will automatically, and without intervention from a human operator, adapt to the new situation and, send the packets originating at 203 through an alternative route, involving for instance, the main nodes 206, 207 and 204 (assuming that all these nodes have packet capacities sufficient to handle the capacity of the main node 203).

Having described in general the invention and some of its preferred embodiments in detail, it will now be obvious to those skilled in the art that numerous modifications can be made therein without departing from the scope of the invention as defined in the following claims.

What is claimed is:

1. A method of preventing network congestion upon restart of a wireless link layered network comprising a plurality of transceivers at respective nodes of a plurality of link layer levels, said plurality of transceivers being configured to route communications from any node to a then central node of the network and wherein said communications are in a form of information packets transmitted from one node to another, said method comprising stratifying reestablishment of communication among said nodes whereby restart is effected layer by layer, and within each link layer level, restart time is randomized and longer in duration within a higher link layer level as against randomized restart time in a lower link layer level.

2. The method as set forth in claim 1, wherein some of the nodes have a link layer level less than the link layer level of others of said nodes, said nodes being configured, upon successfully receiving an information packet, to generate as an acknowledgment to a transmitting node a system control and modifying message (SCMM).

3. The method as set forth in claim 2, further comprising, wherein each transmitting node determines whether the node originating the SCMM is from a link layer level equal to or less than the link layer level of the node eliciting the SCMM, and where the node originating the SCMM has a link layer level equal to or less than the link layer level of the node eliciting the SCMM, in response to the SCMM at the node eliciting the SCMM, rerouting and/or adjusting future transmissions based at least upon information contained in the SCMM.

4. The method as set forth in claim 2, wherein in response to changes at any node, the wireless link layered network is dynamically and without the intervention of an operator kept operational, by promulgating into the network information as to such changes via a message acknowledging the SCMM, and assuring that only the node eliciting such an SCMM uniquely acts upon said information, providing the SCMM originated from a node having a link layer equal or lower than the eliciting node.

5. The method as set forth in claim 4, further comprising, in response to communication crowding in some of the communication paths of the wireless link layered network, dynamically and without the intervention of an operator rerouting messages to parts of the network that are less congested, said rerouting being affected by including in the SCMM a measure of the utilization rate of the node originating the SCMM, and if said utilization rate exceeds a preset level, rerouting messages around said SCMM originating node.

* * * * *